B. M. DES JARDINS.
COMPUTING ATTACHMENT FOR TYPE WRITERS.
APPLICATION FILED OCT. 11, 1900.
1,271,860.
Patented July 9, 1918.
13 SHEETS—SHEET 2.
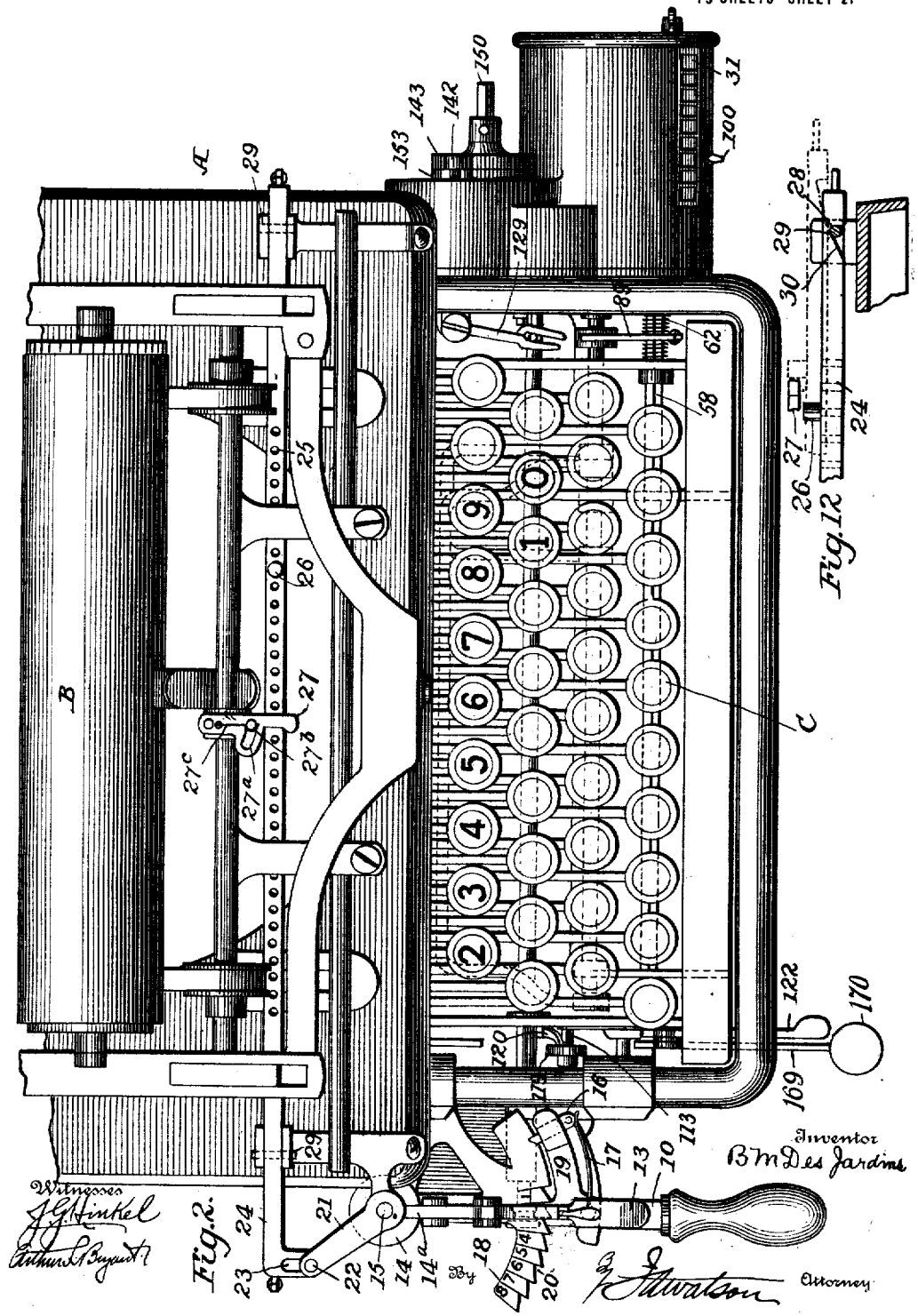

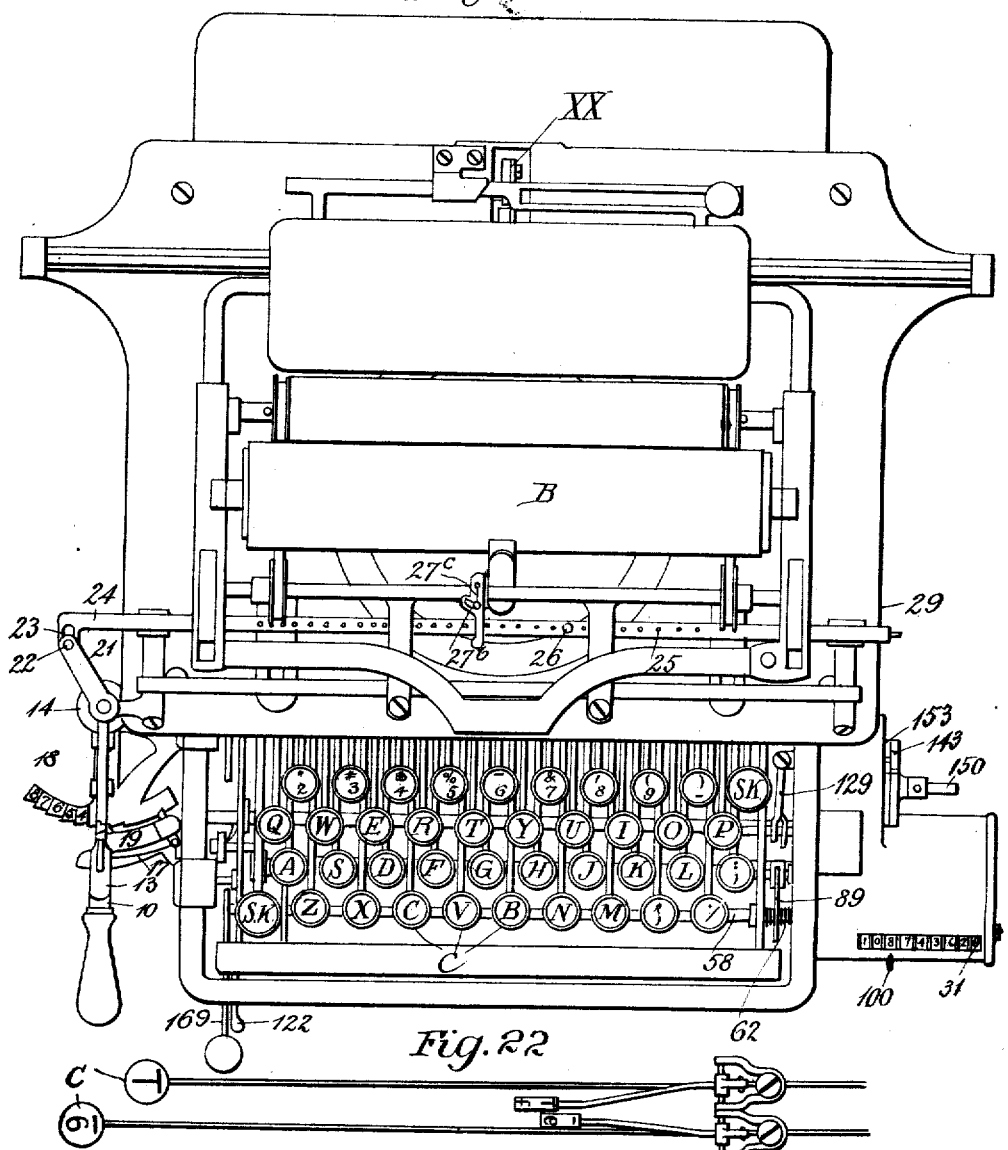

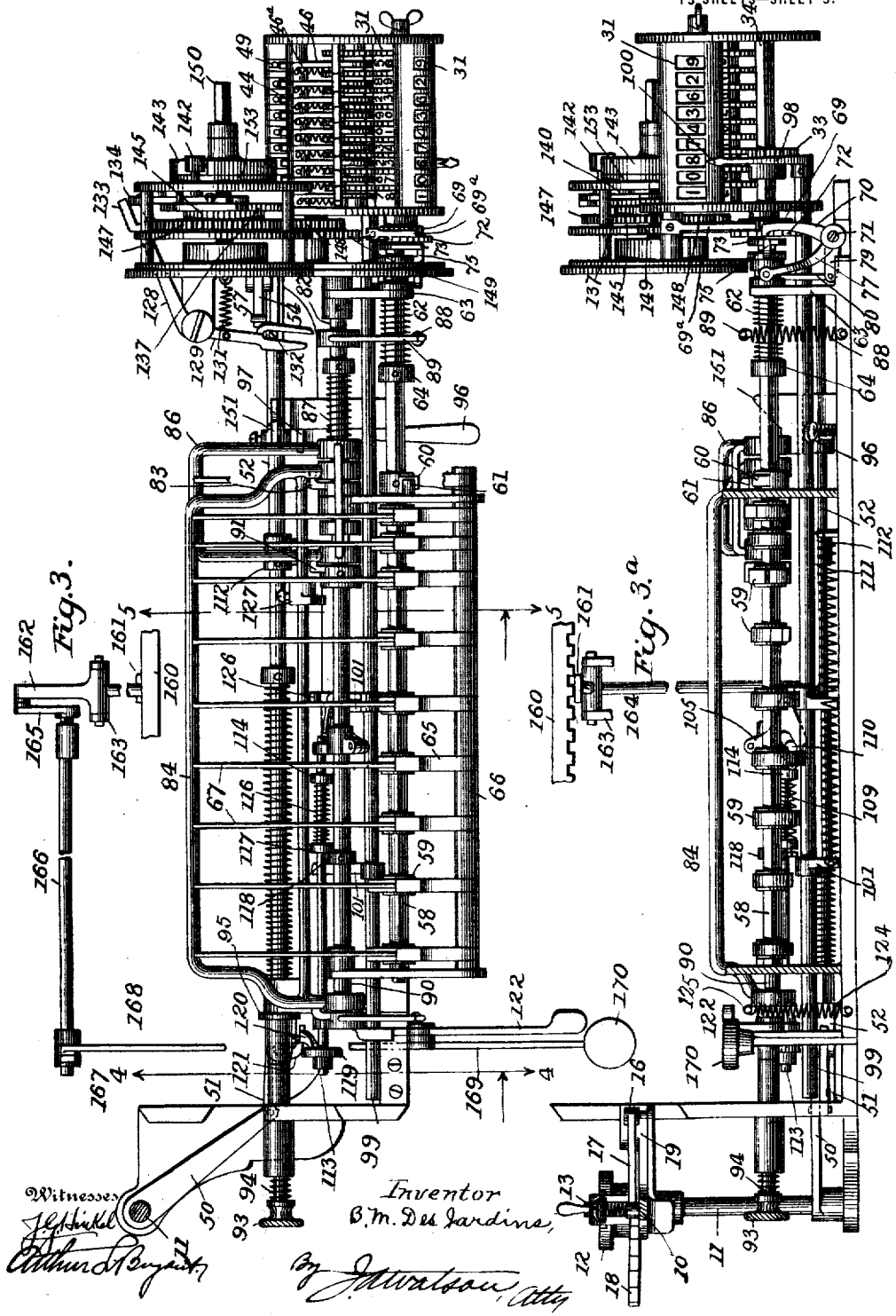

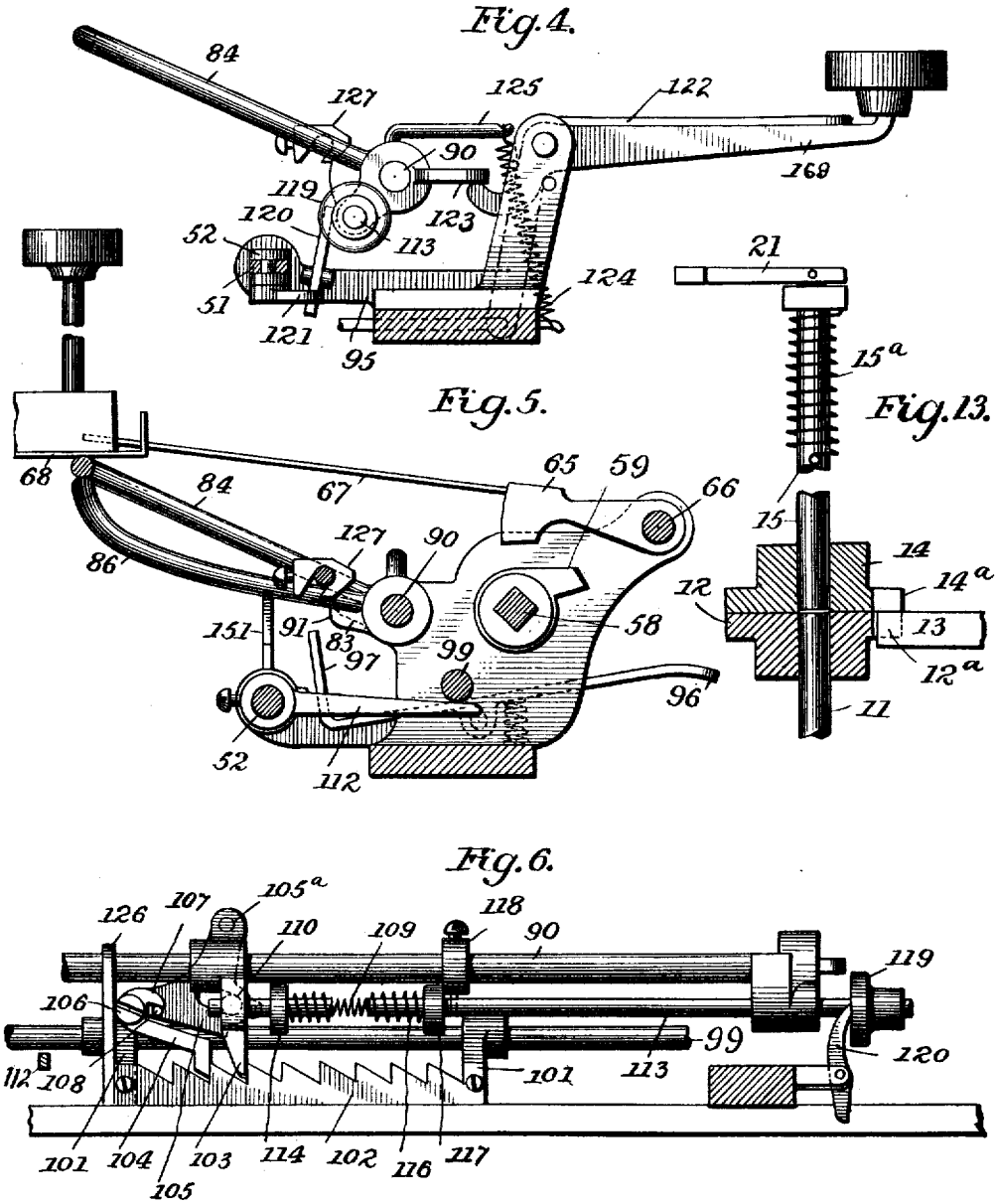

B. M. DES JARDINS.
COMPUTING ATTACHMENT FOR TYPE WRITERS.
APPLICATION FILED OCT. 11, 1900.
1,271,860.
Patented July 9, 1918.
13 SHEETS—SHEET 5.
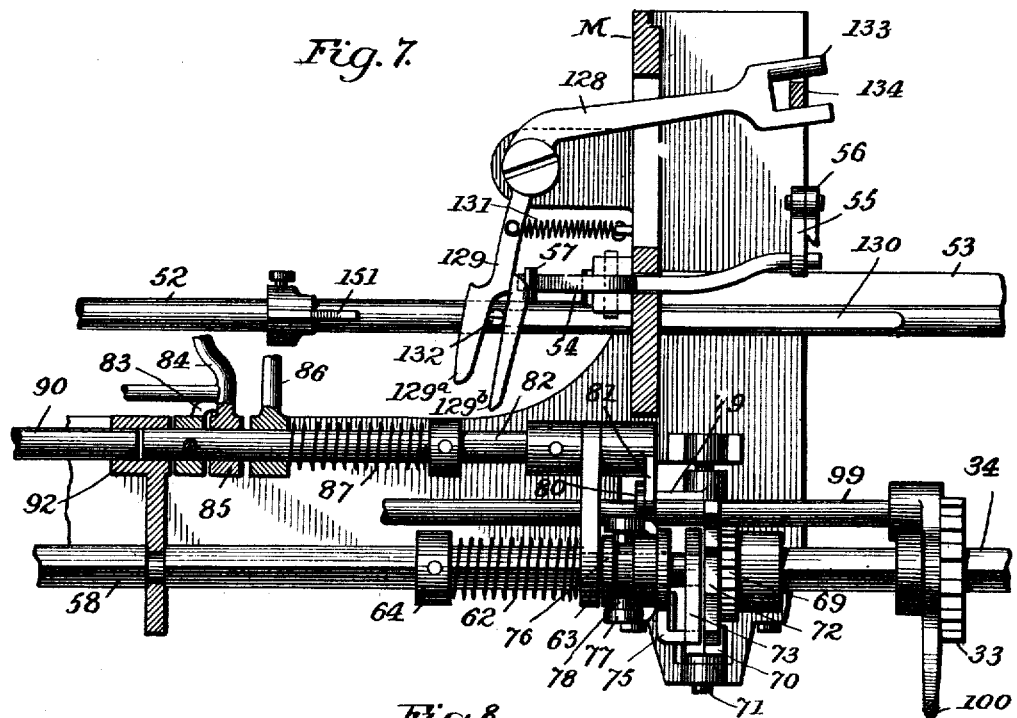
Fig. 7.
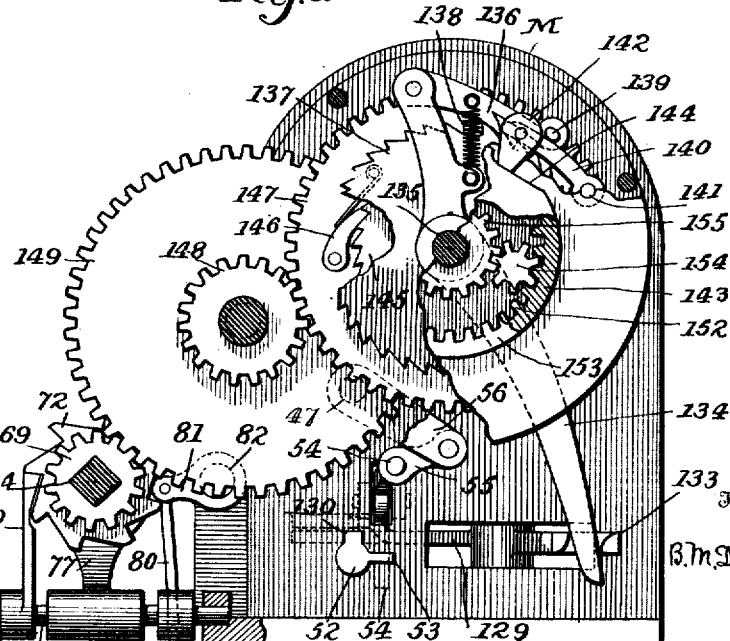
Fig. 8.
Fig. 14.

B. M. DES JARDINS.
COMPUTING ATTACHMENT FOR TYPE WRITERS.
APPLICATION FILED OCT. 11, 1900.

1,271,860.

Patented July 9, 1918.
13 SHEETS—SHEET 6.

B. M. DES JARDINS.
COMPUTING ATTACHMENT FOR TYPE WRITERS.
APPLICATION FILED OCT. 11, 1900.
1,271,860.
Patented July 9, 1918.
13 SHEETS—SHEET 7.
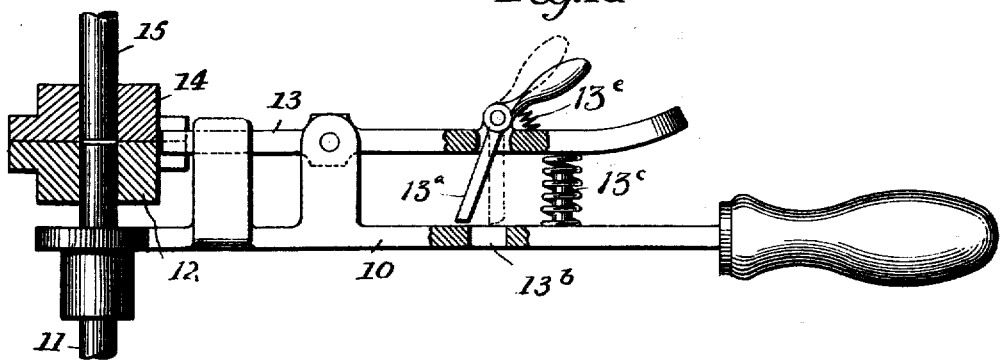
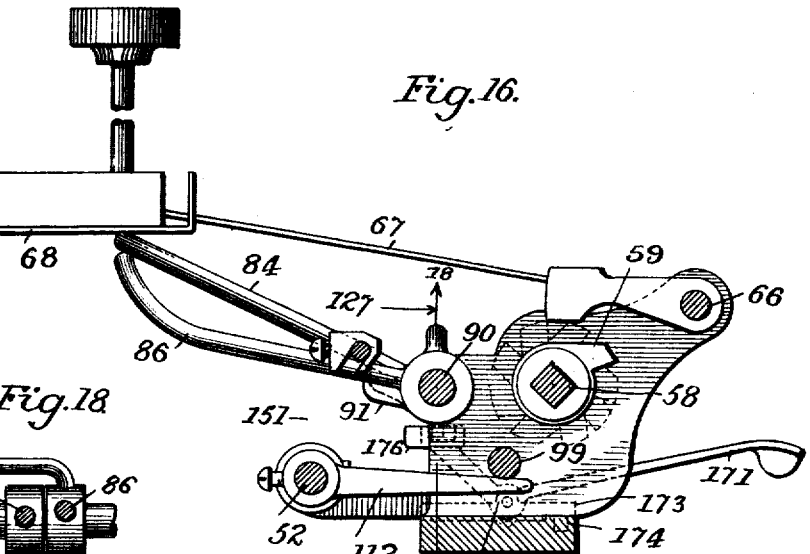
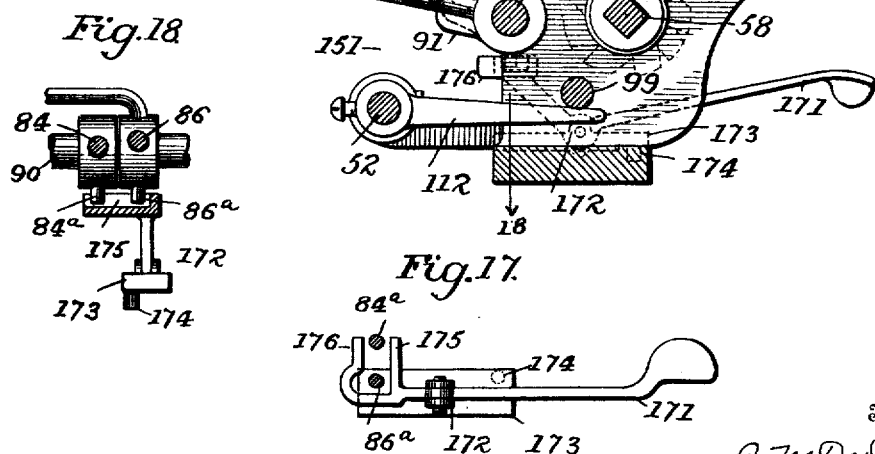

B. M. DES JARDINS.
COMPUTING ATTACHMENT FOR TYPE WRITERS.
APPLICATION FILED OCT. 11, 1900.
1,271,860.
Patented July 9, 1918.
13 SHEETS—SHEET 8.
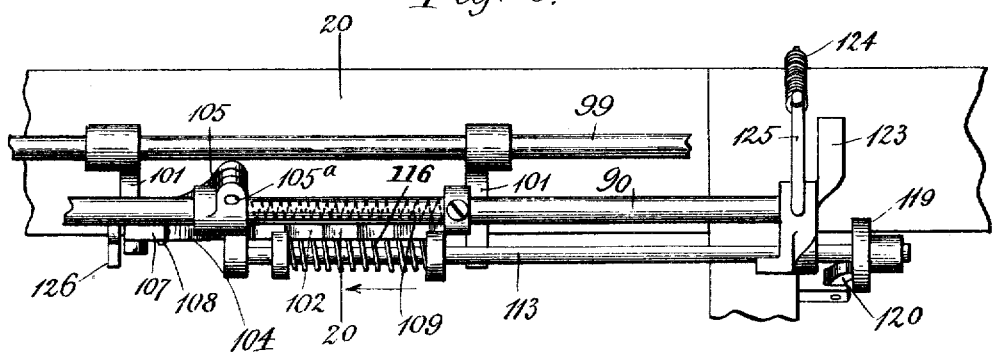
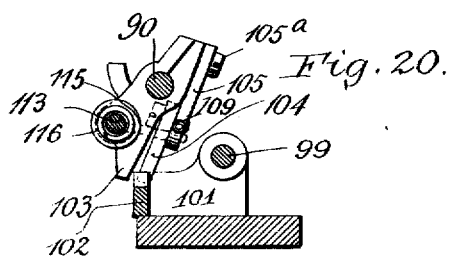
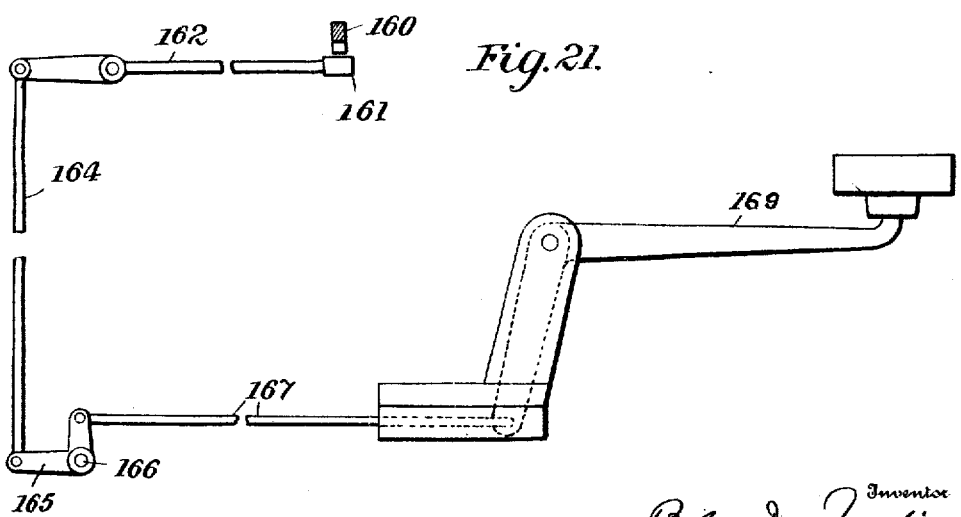

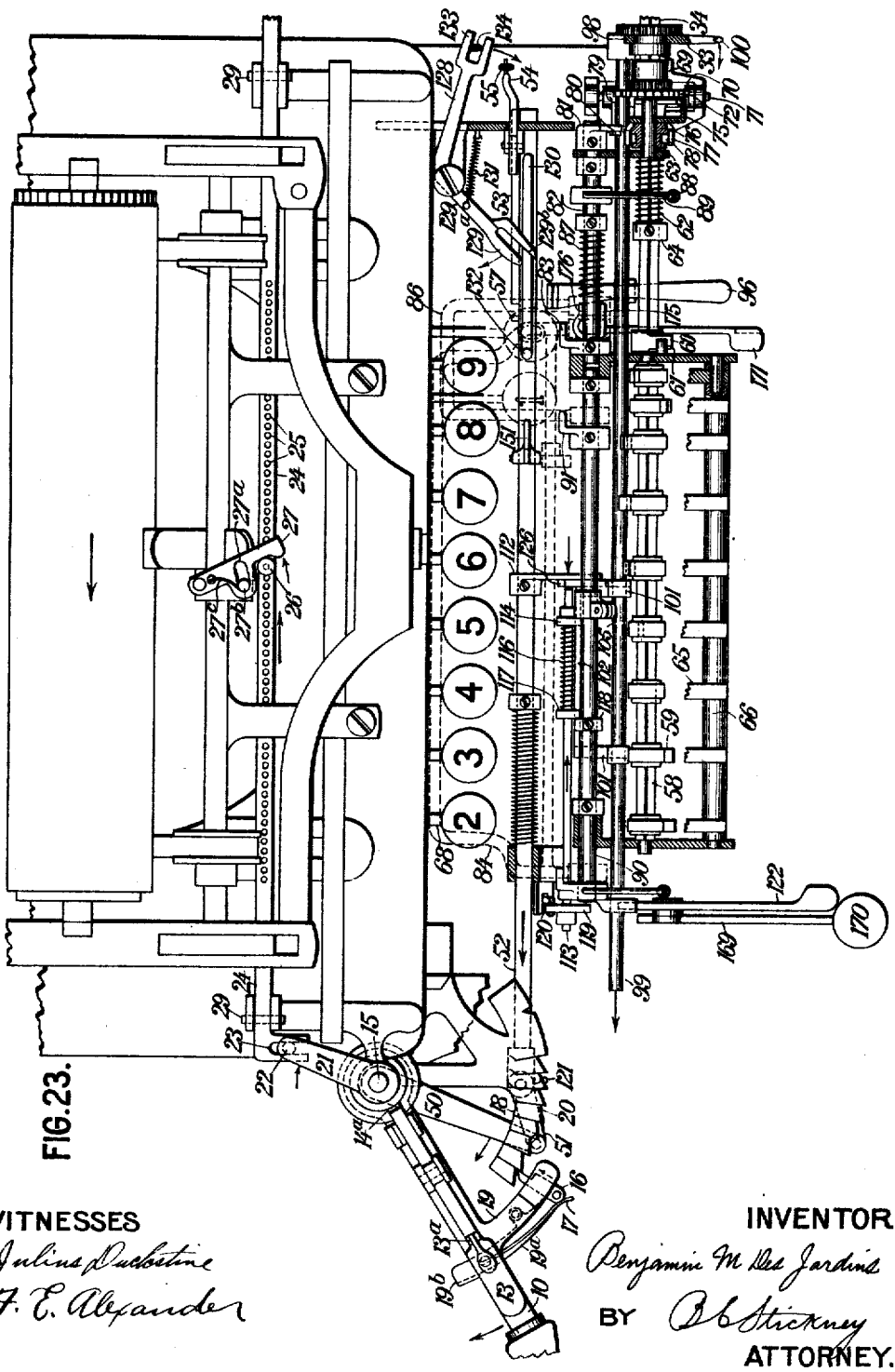

B. M. DES JARDINS.
COMPUTING ATTACHMENT FOR TYPE WRITERS.
APPLICATION FILED OCT. 11, 1900.

1,271,860.

Patented July 9, 1918.
13 SHEETS—SHEET 10.

WITNESSES:
Julius Duckstine
F. E. Alexander

INVENTOR:
Benjamin M. Des Jardins
BY B.C. Stickney
ATTORNEY

B. M. DES JARDINS.
COMPUTING ATTACHMENT FOR TYPE WRITERS.
APPLICATION FILED OCT. 11, 1900.

1,271,860.

Patented July 9, 1918.
13 SHEETS—SHEET 11.

WITNESSES:
Julius Duckstine
F. E. Alexander

INVENTOR:
Benjamin M. Des Jardins
BY D. C. Stickney
ATTORNEY

B. M. DES JARDINS.
COMPUTING ATTACHMENT FOR TYPE WRITERS.
APPLICATION FILED OCT. 11, 1900.
1,271,860.
Patented July 9, 1918.
13 SHEETS—SHEET 12.
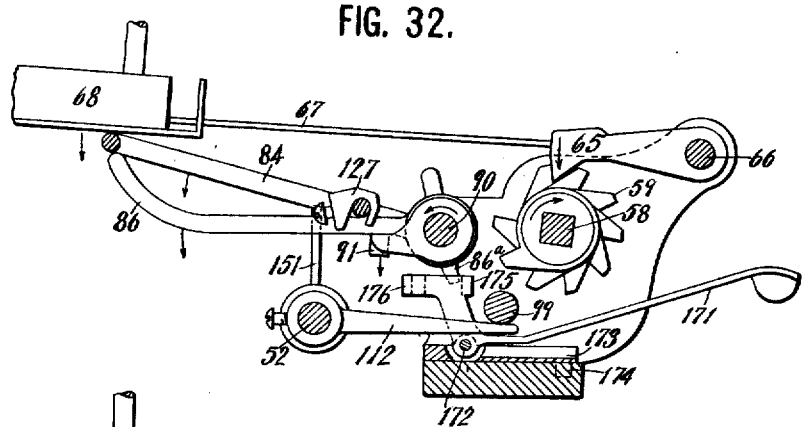
FIG. 32.
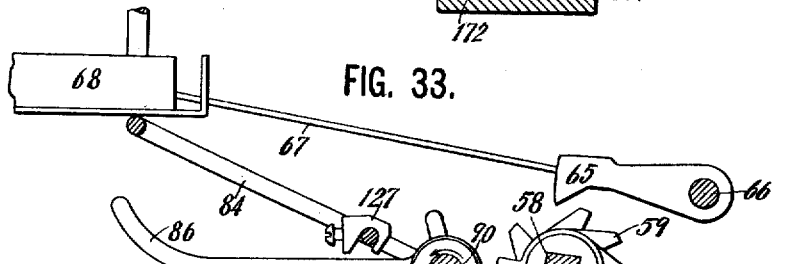
FIG. 33.
FIG. 34.
FIG. 35.
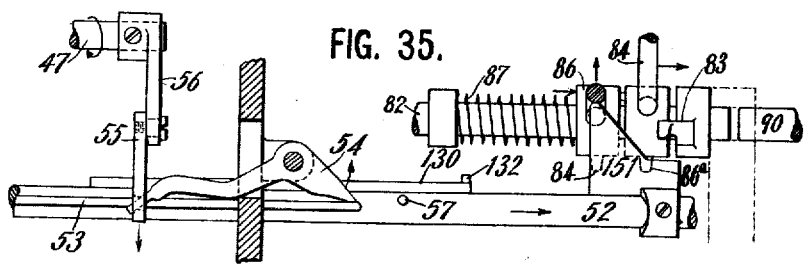
FIG. 28.
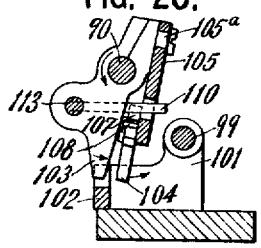
WITNESSES:
Julius Duckstine
F. E. Alexander
INVENTOR:
Benjamin M. Des Jardins
BY B. C. Stickney
ATTORNEY B. M. DES JARDINS.
COMPUTING ATTACHMENT FOR TYPE WRITERS.
APPLICATION FILED OCT. 11, 1900.

1,271,860.

Patented July 9, 1918.
13 SHEETS—SHEET 13.

UNITED STATES PATENT OFFICE.

BENJAMIN M. DES JARDINS, OF WEST HARTFORD, CONNECTICUT, ASSIGNOR TO JOHN T. UNDERWOOD, OF BROOKLYN, NEW YORK.

COMPUTING ATTACHMENT FOR TYPE-WRITERS.

1,271,860.  Specification of Letters Patent.  Patented July 9, 1918.

Application filed October 11, 1900. Serial No. 32,746.

*To all whom it may concern:*

Be it known that I, BENJAMIN M. DES JARDINS, citizen of the United States, residing at West Hartford, in the county of Hartford and State of Connecticut, have invented certain new and useful Improvements in Computing Attachments for Type-Writers, of which the following is a specification.

My invention relates to computing machines, and is herein illustrated as applied to a combined typewriting and computing machine, in which the numeral keys of the typewriter may be connected to the computing mechanism to control the same.

The computing mechanism includes a gang of computing wheels, which wheels may be engaged *seriatim* by a denominational selector or master wheel to turn them. This master wheel may be power-driven, and the computing wheels turned thereby to an extent determined by the numeral key operated.

Said master wheel is driven by a shaft which is preferably formed in line with an indexing shaft, to which it is coupled by the operation of every numeral key, so as to turn therewith. When so coupled, both shafts will rotate until an indexing stop, which has been positioned by the numeral key operated, intercepts a stop on said indexing shaft, and so arrests the same, together with the master-wheel shaft to which it is coupled. Upon return of the key, the shafts are uncoupled.

The computing wheels may be arranged in a totalizer fast on the typewriter frame; and in order that the computations may take place in their proper order, the master wheel is fed in a direction opposite to that of the typewriter carriage. To attain this end there is preferably provided a computing machine carriage which controls the engagement of the master wheel with the computing wheels. An escapement feeds said computing machine carriage one step to the right at every operation of a numeral key. Means may also be provided for locking the computing machine escapement against accidental displacement.

This computing mechanism will enable numbers written in any position on the work-sheet in the typewriter to be properly added just as though they were positioned in columns. This is facilitated by the use of a tabulating device which sets the master wheel to the desired denominational position, so that it will engage successively just as many computing wheels, in traveling to the units wheel, as there are digits in the number to be recorded. When numbers are not positioned in columns, the computer tabulating mechanism may be disconnected from the carriage of the typewriter. To enable this to be done, the typewriter tabulating mechanism may comprise a shaft which is alined with a rock shaft used for positioning and returning the computing machine carriage. A handle in said tabulating device may also comprise a coupling arm arranged to be rocked so that it will turn either of said shafts or both simultaneously. This construction enables a single handle to be used for tabulating on the typewriter and for properly positioning the computing mechanism. At the operation of the tabulating device, the computing carriage is drawn to the left to a distance dependent upon the number of digits in the number to be computed and written.

The numeral keys are preferably normally disconnected from the computing mechanism, but may be connected to operate the same by means of the tabulating device. For this purpose said tabulating device may be arranged to swing a universal member or bail beneath the numeral keys, to control the indexing operation and also the feeding of the computer carriage. After a digit is written in the units position in any computation, an arm may move the bail operated by the numeral keys to ineffective position, and thereby disconnect the computing mechanism from the typewriting mechanism.

The computing mechanism is preferably power-driven, the power being obtained from a driving spring which is wound up every time the computing mechanism is connected to the typewriter. Said spring is preferably connected by gearing to the shaft of the master wheel in such a way that it constantly tends to rotate said shaft; so, when said master wheel is released, said spring will cause said master wheel to rotate the computing wheel it then engages until arrested. In moving the aforesaid universal bail to effective position, an arm may be swung to wind up the driving spring aforesaid.

The computing mechanism proper may comprise computing wheels which are normally held locked, thus preventing any accidental movement of said wheels due to jarring of the mechanism or friction from adjacent wheels. This lock may comprise a cam member which is swung between the teeth of a carrying wheel, which carrying wheel is always in mesh with its dial wheel, there being one carrying wheel for each computing wheel. The dial or computing wheel in mesh at any moment with the master wheel is preferably held free from said locking arm by moving the cam to an inoperative position. This movement may be accomplished by means of an extension on the rod which gives said master wheel its *seriatim* movement, said rod carrying a cam surface which swings said locking cam to ineffective position.

For each of said computing wheels there may be a carrying lever, which a spring normally tends to move, so as to carry over a unit onto said wheels. Said lever, however, may be normally restrained by a dog which catches in a hook on a trip lever operated by a carrying shoulder on the wheel next lower in denomination. When said trip lever is moved by said carrying shoulder, it releases said carrying lever, so that said lever swings a drive pawl into engagement with the carrying wheel next higher in denomination, thus moving it one unit space; and said carrying lever, in so being operated, moves to ineffective position the locking cam for the carrying wheel which is then being turned through a unit space.

As said carrying pawl drives said carrying wheel, a small dog or detent on the point of said carrying lever may lock between two adjacent teeth on said carrying wheel and so make certain that said carrying wheel is moved to the proper extent. The carrying levers hold any carrying wheel locked which they have operated on. Said locks may be released and the whole computing mechanism may be reset to normal position when the tabulating handle is moved to reset the master wheel for beginning a new computation.

Other features and advantages will hereinafter appear.

In the accompanying drawings,

Figure 1 is a plan view of a Remington typewriting machine, No. 2, with the computing attachment and tabulating device connected thereto.

Fig. 2 is a plan view of the front half of a typewriting machine showing the invention applied thereto.

Fig. 3 is a plan view of the computing mechanism, the typewriting machine and setting lever being detached.

Fig. 3ª is a front elevation of the parts shown in Fig. 3, and including the setting lever.

Figs. 4 and 5 are sections on the lines 4—4 and 5—5, respectively, of Fig. 3.

Fig. 6 is a partial rear view of the driver feeding mechanism.

Fig. 7 is an enlarged plan view of parts shown at the right end of Fig. 3.

Fig. 8 is an enlarged right end view of the computing devices, parts being broken away.

Figure 9:
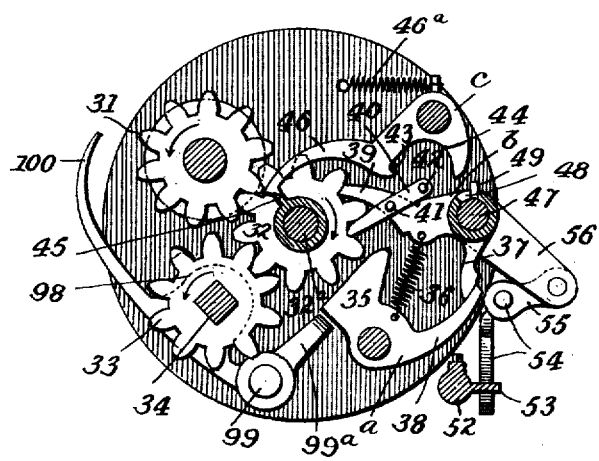
Figure 10:
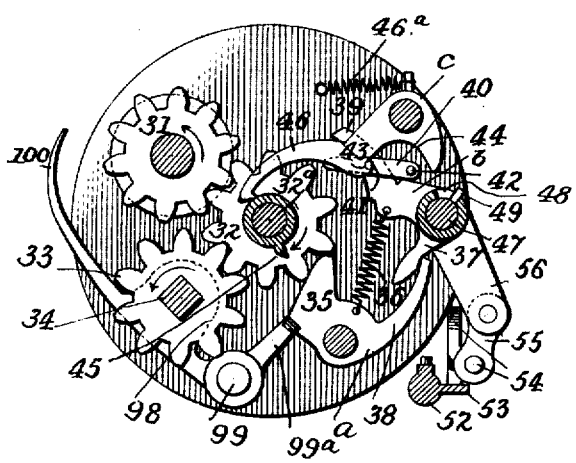

Figs. 9 and 10 show the carrying and indicating devices in two different positions.

Figure 11:
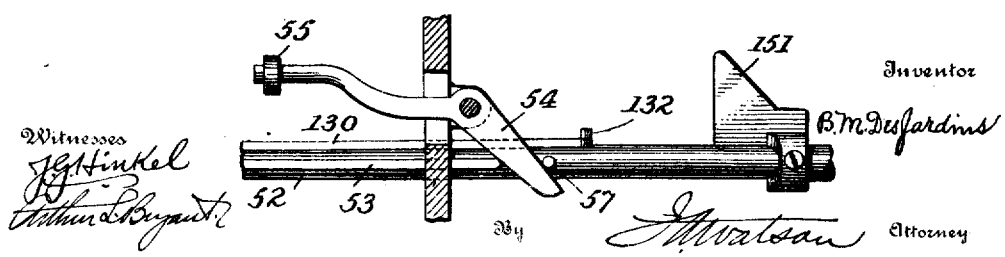

Figs. 11 and 12 are details.

Fig. 13 is a detail of one of the clutches.

Fig. 14 is a detail of a part of Fig. 7.

Fig. 15 is a detail of the clutch-operating lever shown in Figs. 2 and 3ª.

Fig. 16 is a view, similar to Fig. 5, illustrating a modified device for manipulating the bails 84 and 86.

Fig. 17 is a detail of said device.

Fig. 18 is a detail in section on the line 18—18 of Fig. 16.

Fig. 19 is a plan view of the mechanism shown in Fig. 6.

Fig. 20 is an end view of the computer escapement.

Fig. 21 shows the connections of a carriage-release key.

Fig. 22 is a detail view of two type-bars and their actuating keys.

Fig. 23 is a view similar to Fig. 2, but showing the tabulating mechanism at the end of its stroke, with many of the typewriter keys removed in order to show the details of the computing connections.

Figure 24:
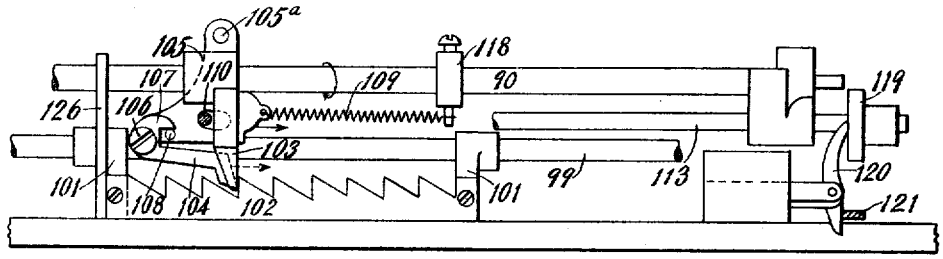

Fig. 24 is a rear view of the computing carriage escapement mechanism showing most of the parts seen in Fig. 6, but when the escapement dogs have been rocked by the depression of a numeral key.

Figure 25:
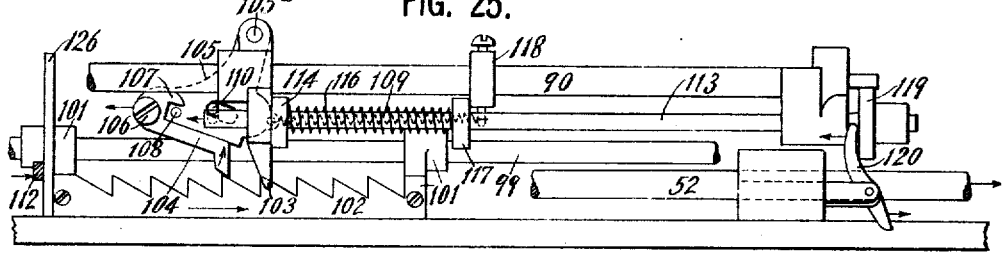

Fig. 25 is a view similar to Fig. 24, but shows said escapement mechanism in the act of being positioned by the tabulating handle.

Figure 26:
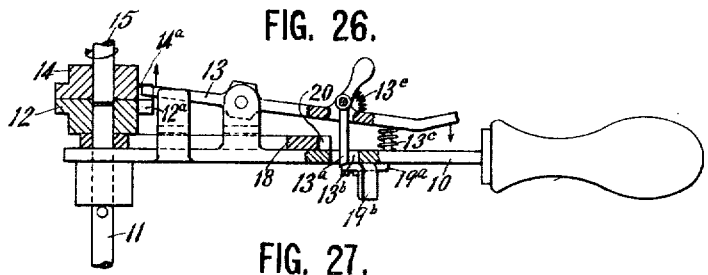

Fig. 26 is a view similar to Fig. 15, but shows the tabulating handle connected to operate the typewriter tabulating mechanism alone.

Figure 27:
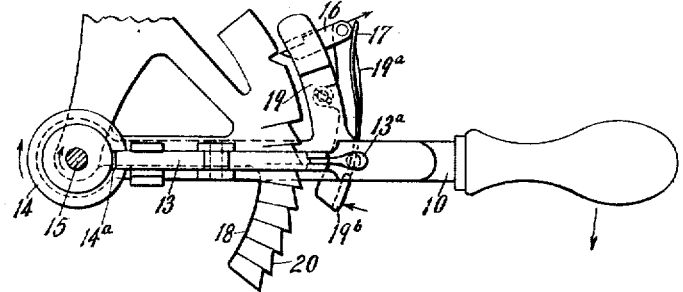

Fig. 27 is a plan view showing the tabulating handle at the moment of being moved.

Fig. 28 is a section like Fig. 20, but showing parts in the position shown in Fig. 24.

Figure 29:
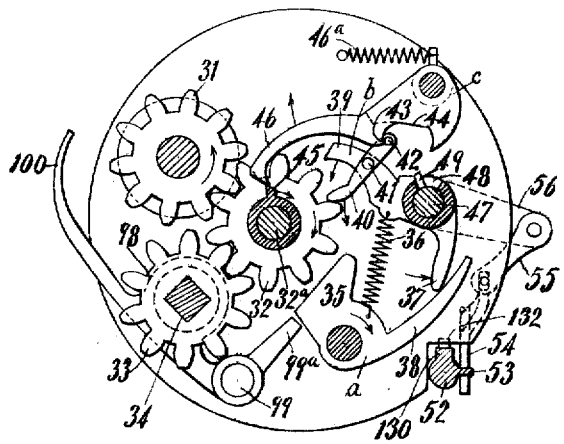

Fig. 29 is a section similar to Fig. 9, showing the computing and carry-over devices at the beginning of a carry-over operation.

Figure 30:
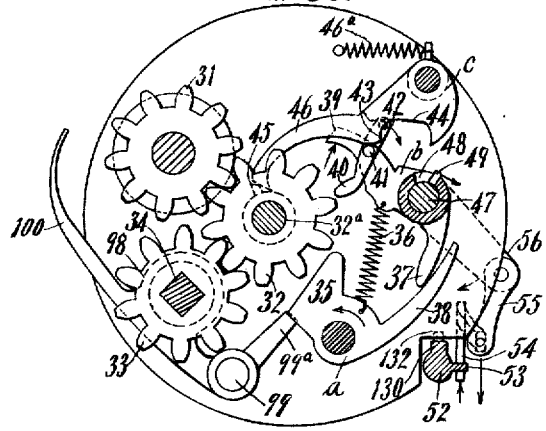

Fig. 30 is a similar section showing the carry-over mechanism when it is being reset by the tabulating handle.

Figure 31:
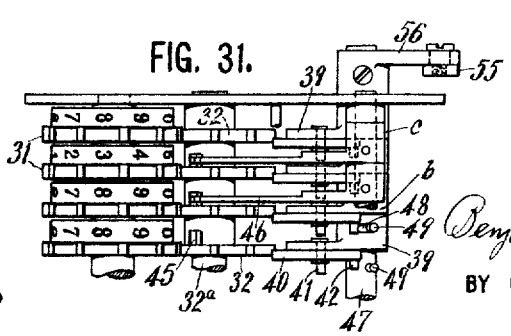

Fig. 31 is a plan view of the dial wheels and the carry-over devices.

Fig. 32 is a view similar to Fig. 16, but showing the "9" key depressed and arresting the stop-shaft.

Fig. 33 is a view similar to Fig. 5, but showing the handle 171 depressed to feed the computing carriage one letter-space without doing any computation.

Fig. 34 is a view similar to Fig. 17, but showing parts in the position seen in Fig. 33.

Fig. 35 is a rear view of part of the setting rod and part of its connection to the resetting mechanism for the carry-over mechanism.

Figure 36:
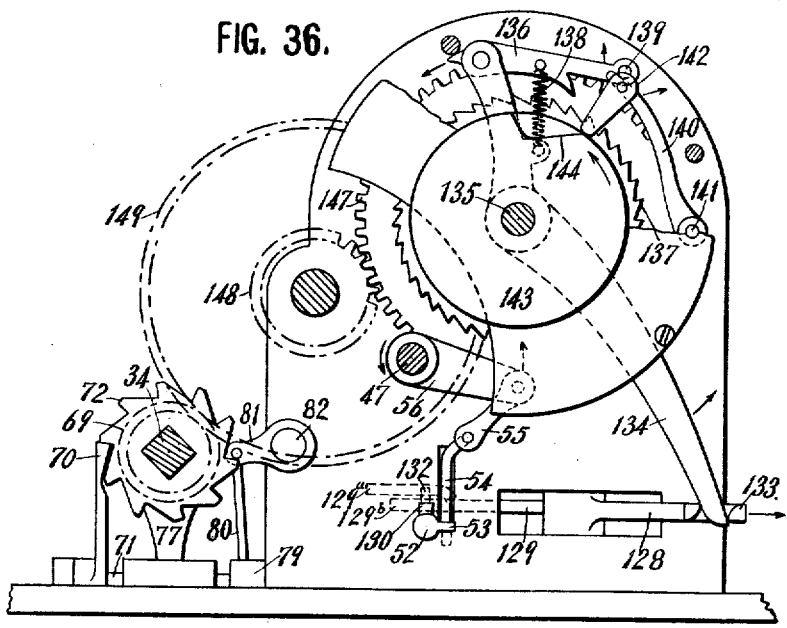

Fig. 36 is a view similar to Fig. 8, but shows the winding mechanism and certain other parts in the normal idle position of said winding mechanism.

Figure 37:
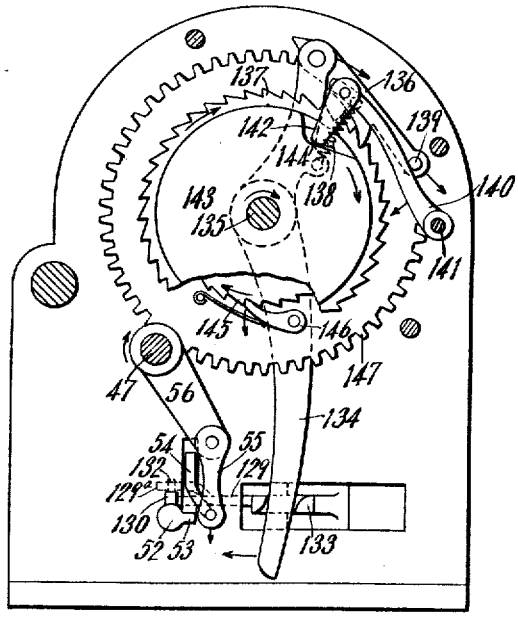

Fig. 37 is a similar view, showing the winding mechanism at the end of a winding stroke.

Figure 38:
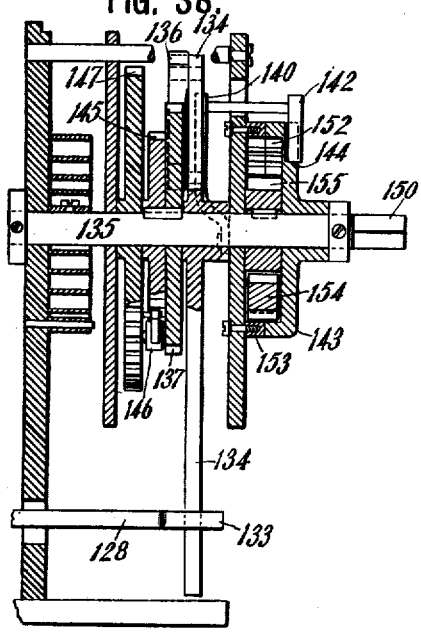

Fig. 38 is a section through Fig. 14.

Numeral and alphabet key levers 68 operate type as is usual on a Remington typewriting machine. Each numeral key lever 68 also controls at will, in a manner described hereinafter, numeral or dial wheels 31 by means of a driver or master wheel 33 arranged in a manner described hereinafter to engage said dial wheels *seriatim*.

Each numeral key lever 68 loosely engages an arm 67 (Figs. 5, 16 and 32) to swing it down about its pivot, these arms 67 being pivoted side by side upon a horizontal rod 66. By reason of the depression of any arm 67, an indexing stop 65 thereon is swung down into the path of a corresponding index-tooth or stop 59 on a horizontal revoluble shaft 58, which is driven by power, and may be regarded as an indexing shaft for the dial wheels 31. The indexing stops 59 are arranged helically upon said shaft 58, while the indexing stops 65 are arranged in a straight row, so that the extent of revolution of the power-driven shaft 58 depends upon which stop 65 is set, that is, upon which numeral key is depressed.

This variably-rocking indexing shaft 58, which returns to normal position after each computation, is used for the purpose of controlling the extent of rotation of the master wheel 33 and hence of the dial wheels with which it successively engages. The master wheel tends normally to rotate, but is under restraint, and is permitted by any numeral key to escape from restraint and to turn as far as may be determined by said key through the instrumentality of the indexing shaft 58. For this purpose said shaft is caused to connect with the master wheel at every numeral key stroke.

A shaft 34, (Fig. 7), on which the master wheel 33 is splined (to permit it to engage successive computing wheels while controlled by said shaft), is under constant tendency to be turned by means of a spring motor shaft 135 (Figs. 8 and 38), and so tends to turn any computing wheel 31 with which the master wheel engages.

Said master wheel 33 is, however, normally prevented from turning by means of an escapement tooth or stop 70 which (Figs. 7, 8 and 36) normally intercepts one of the teeth 72 of an escapement wheel on the shaft 34 of said master wheel 33; there being, in the present example, ten such teeth or projections 72.

At the depression of a numeral key, said stop 70 is swung to release the tooth or wheel 72, allowing said power-driven masterwheel shaft 34 to rotate; but at the same time said indexing or stop shaft 58, which is alined with said master-wheel shaft 34, is automatically clutched to said master-wheel shaft by means of a lug or coupler 75, (Fig. 7), which engages a tooth 72 to couple shaft 58 to shaft 34. Said stop shaft 58 is now turned by power-driven shaft 34 until an indexing stop 59 on 58 is intercepted by the stop 65 that has been swung down by the numeral key operated (see Fig. 32). In this way the master wheel is turned by power at the stroke of every numeral key until the indexing shaft 58 is arrested by the stop 65 interposed by said numeral key. For rotating the indexing shaft 58 back to normal position after it is uncoupled from drive-shaft 34, there is provided a spring 62, which may encircle shaft 58. Said spring normally holds a stop 60 on said shaft against a stop 61 on the frame (see Figs. 3ª and 23). Spring 62 is weaker than the motor spring.

For enabling the keys to operate the coupler 75 and the escapement stop or dog 70, there is provided underlying the numeral keys, to be depressed thereby, a universal bail 84 (Fig. 3). This bail overlies an arm 83 on a rock shaft 82, which rock shaft swings said escapement stop 70 by means of a link 80 (Fig. 36), pivoted at one end on an arm 81 fast on shaft 82; the other end of this link 80 being pivoted to an arm 79 fast on a rock shaft 71, as shown in Fig. 3ª. On said rock shaft 71 there is also fixed a yoke 77 (Figs. 3ª, 7 and 23) carrying pins 78, to reciprocate the coupler 75 into and out of mesh with the teeth or projections 72; this movement being effected by means of a collar 76, forming part of said coupler and having a peripheral groove wherein said pins 78 work. On the end of said stop shaft 58 is fast a collar 73 (Fig. 14), having a slot 74 in which said coupler 75 fits and slides as it moves into and out of mesh with said teeth 72, whereby the shafts 34 and 58 are automatically coupled and uncoupled as the keys operate.

The bails 84 and 86, it will be noted, are capable of swinging freely on the rock shafts on which they are pivoted, and operate said rock shafts by means of the arms 91 and 83, which underlie said bails. Said bail 84 is normally held in its upper position by a spring 88, arranged to engage a rock arm 89 on rock shaft 82; and a spring 124, engaging rock arm 125 fast on rock shaft 90, is arranged to normally hold the bail 86 raised.

At the operation of the numeral keys, the master-wheel 33 is fed or shifted laterally step by step, to engage seriatim with the computing wheels, by means of a rod 99, extending transversely of the machine, and driven to the right by a spring 111 (Fig. 3ª). This rod forms a computing machine carriage, to which is secured a feed-rack 102, (Fig. 6), in which key-controlled feed-dogs 103 and 104 are arranged to work, to permit said rack and carriage to be fed to the right, as viewed from in front in Fig. 3ª.

The rod or carriage 99 carries the master-wheel 33 transversely, so as to engage the computing wheels successively, by means of a finger or pointer 100, which has a yoke-shaped arm 98 to engage a groove in master-wheel 33.

The feeding of the master-wheel carriage is effected each time that any numeral key is depressed. The key rocks down the bail 84, as above described, and the bail rocks bail 86, thus swinging the rock shaft 90 (by means of rock arm 91 fast on said shaft), so as to move the flexible or swinging feed-dog 104 out of said rack, and also to move fixed dog 103 into said rack. Previous to the return stroke of said numeral key, said flexible or swinging dog 104 will have been snapped over by a spring 109 (see Figs. 24 and 28) so that it will mesh with the next tooth of said rack, thereby permitting said rack to feed to the right, one space, as usual in typewriting machines. Thus it will be seen that on the return stroke of a numeral key, said rack is fed forward one space, and the master-wheel is moved to engage with the computing wheel next lower in denomination.

In operating a numeral key, index-stop arm 67 is swung down to determine the extent of computation, and at the same time bail 84 is depressed, rocking shaft 82 by means of arm 83 (Fig. 7), and depressing arm 81 on the end of said shaft (Figs. 7, 8 and 36), thrusting down link 80, and by means of arm 79 (Fig. 3ª) rocking the shaft 71, thus both withdrawing the escapement dog 70 from the tooth 72 of the escapement wheel, and by means of arm 77 coupling the indexing shaft 58 to the master-wheel shaft 34 on which said escapement wheel or teeth 72 are fixed; said shafts being then rotated by the spring shaft 135 until the depressed indexing arm 67 arrests the corresponding index stop 59 on shaft 58. Hence the master-wheel rotates from 1 to 9 points, according to the key operated; and the dial wheel 31 that is at that time connected to the master-wheel, is rotated to the same extent. During the down-stroke of the key, the master-wheel carriage remains unmoved, since the bail 84, in depressing bail 86, and swinging the rock-shaft 90, merely moves the feeding dog 104 out of the rack 102, and the fixed or detent dog 103 into said rack.

Upon the relief of the numeral key from pressure, the bails 86 and 84 rise, the shafts 34 and 58 are uncoupled, the escapement dog 70 reëngages the teeth 72, and the uncoupled shaft 58 is rotated back to normal position by its spring 62. At the same time the rock shaft 90 returns to normal position, withdrawing the detent dog 103 from the rack, which now advances, carrying with it the master-wheel 33. At the same time that the dog 103 was withdrawn, the feeding dog 104 was let into the next notch in the rack, so that the carriage is permitted to feed one step, until the master-wheel reaches the next lower computing wheel.

For the zero type key there is provided the separate depressible bail 86, which may be arranged to underlie said bail 84, so that aforesaid rock arm 91 underlies one end of said bail 86; while the rock arm 83, which operates the uncoupling and coupling of the master and indexing shafts 34 and 58, is not operated by said bail 86. This will relieve the zero key of operating said coupling, but at the same time arranges so that the zero key feeds the master-wheel carriage to the right every time zero is written. The carriage B of said Remington typewriter illustrated in the drawings usually comprises a rack-bar which engages with letter-feeding or carriage-escapement dogs seen at XX in Fig. 1. By this common construction the carriage B in said Remington machine is fed a step at every stroke of an alphabet or numeral key.

Provision is made for adjusting or tabulating both the typewriter carriage B and the adding machine carriage 99 to the position where it is desired to begin the writing and adding of a number, and also for effecting separate adjustment when desired. The tabulating may be controlled by means of a handle 10 (Figs. 2, 15, 26 and 27). This handle 10 may be caused to engage a vertical rock shaft 11; said rock shaft having fast at its lower end, as seen in Figs. 3, 3ª and 23, a rock arm 50 which, by means of a link 51, is pivotally attached to a setting rod 52. Fast on this setting rod is an arm 112 extending forwardly of the machine (see Figs. 3, 3ª, 5 and 23), so that it normally lies just to the right of the idle position of the computing carriage escapement-rack 102 (see Fig. 6). It should be noted in said Fig. 6 that the mechanism is viewed from the rear and that, therefore, the arm 112 is at the left, as viewed in said figure. Thus when rod 52 is drawn to the left, as viewed in Fig. 3, it will strike said escapement-rack 102 and draw said rack to the left (see Fig. 23). The described movement would be toward the right at Fig. 6, which is a rear view. The dog 103 is normally out of engagement with the rack, and so does not interfere with the movement of the rack to the right of Fig. 6. The dog 104, during such movement of the rack, clicks idly over the beveled surfaces of the rack teeth, being pivoted at 106 to permit it to yield as the rack moves back preparatory to beginning a new computation.

Said tabulating handle 10 may turn idly about said rock shaft 11, but may be locked thereto by means of a locking bar 13 pivoted on said handle and arranged to be normally held by a spring 13° in such position that it will lie within a slot in a collar 12 fast on said rock shaft 11, whereby the computer carriage may be tabulated independently of the typewriter carriage. Said locking bar 13 will be lifted out of said slot if it is depressed (see Fig. 26) by the finger of the operator at its outer end, so in that case said tabulating handle 10 may turn idly with respect to said rock shaft 11, whereby the typewriter carriage may be tabulated independently of the computer carriage.

The tabulating handle 10 also comprises an arm 19, in which is guided a pawl 16, which may serve as an indicator for the amount said arm is moved; and, for this purpose, said pawl is offset from the plane of its rock arm 19ª, so that said pawl is positioned to move over a rack 20, which is suitably graduated (see Fig. 3ª). As shown herein, said rack is so graduated that the first tooth marked "1" will show that the handle has been sufficiently moved to bring the master wheel 33 to engage with the units computing wheel; the second tooth marked "2" will show that said master wheel is in engagement with the tens computing wheels, and so forth. The pawl 16 is pivotally mounted on the rock arm 19ª, which rock arm is pivoted on the handle 10, and an extension 19ᵇ of said arm 19ª lies adjacent the handle 10, so that by manually swinging rock arm 19ª, the pawl 16 may be swung clear of the teeth of the rack 20 (see Fig. 27) against the tension of a spring 17, which normally holds it in engagement with said rack. The pawl 16 normally rests in a notch in an extension of the scale 18, and it should always be returned to normal position after the tabulating operation, thus holding the arm 112 clear of the travel of the computer carriage.

Said tabulating handle 10 is also arranged to turn an upwardly-extending rock shaft 15 against a spring 15ª by means of said locking arm 13, and through said rock shaft 15 said handle 10 may control a typewriter tabulating mechanism, comprising a rack bar 24 movable on the frame of the typewriting machine, so as to bring any of a series of settable studs on said bar into the path of a stop 27 on the carriage of the typewriter. Said bar 24 normally lies so that any stud 26 on it will lie below the path of the stop 27 (see Fig. 12). Said bar is shiftable on pins 29 by means of a rock arm 21 fast on said rock shaft 15 (see Fig. 23) so as to be swung laterally of the machine by said handle 10. For this purpose the rock arm 21 comprises a pin 22 working in a slot 23 on said rack bar 24, and as said rock arm swings, it moves rack bar 24, as seen in dotted lines in Fig. 12, so that it rises on the pins 29 by means of inclines 30 and raises said stud 26 into the path of stop 27. The stud or stop 26, it will be seen, is adjustable along said rack bar 24 by means of openings 25 in said rack bar, in any of which it may be placed.

If only a single column is to be typed and added, only a single column-stop 26 may be employed; but if there are to be two columns typed side by side on the page, another column-stop pin 26 may be set at an appropriate place, for example in the twelfth hole from the illustrated stop 26. Both column-stops would be normally too low to reach the carriage-stop 27, but may be brought up by the movement of the column-stop rod which is effected by the handle 10. Thus after typing and adding a number in one column, the handle 10 would be utilized for positioning both carriages at the proper decimal point in the second column, as determined by the second column-stop 26; and then the operative would proceed to type and add the desired number in the second column. The totalizer would show the sum of the two numbers that were so typed on the sheet. If three columns are to be typed and added, three stops 26 may be used, and so on.

The carriage stop 27 may be swung (see Fig. 23) on the carriage to an extent determined by a pin 27ᵇ working in a slot 27ª on said stop, and the length of said slot is so arranged with reference to the width of the stop 27, that the stop 26 will arrest said carriage at the same point whether the carriage is traveling to the right or to the left. A spring 27ᶜ normally holds said stop 27 in position to arrest the carriage as said carriage travels to the left in letter-feeding direction.

When the computing machine carriage, of which the rack 102 forms a part, has been positioned by handle 10, and the numeral keys are then operated so as to carry into the computing wheels the desired numbers, said rack is fed along, as above described, by means of the dogs 103 and 104. When the units wheel is operated, said rack is fed along one more space, and, in so feeding, an extension 126 of said rack strikes a stop 127 on a cross bar of the bail 84 and pushes said bail to the right, as viewed in Fig. 3, so that it slips off rock arm 83 and also moves bail 86 by the striking together of the hubs of the two bails, so that said bail 86 slips off rock arm 91. These bails are normally held in position over said rock arms by means of a spring 87 encircling rock shaft 82, and bearing against a collar on said rock shaft (see Fig. 3). This disconnects the computing mechanism from the typewriter, after writing the last digit of a number.

The tabulating handle 10, by varying the position of its coupling or locking bar 13, may operate not only the tabulating mechanism above described, but also at the same time may position the computing machine carriage 99. For this purpose the locking bar 13 comprises a swinging stop 13ª which normally holds the position seen in dotted lines in Fig. 15, (also shown in full lines in Fig. 26), in which position, if said locking bar 13 is depressed, the tabulating mechanism alone will be operated, for said locking bar will engage only the hub 14. If, however, the locking bar 13 is depressed to the point shown in Fig. 15, said locking bar will engage both of hubs 14 and 12, and consequently tabulate both the typewriter carriage and the computing machine carriage. A spring 13ᵉ normally holds said stop 13ª in the position shown in dotted lines in Fig. 15.

The computing mechanism may be restored automatically to effective condition. When the computing machine carriage is brought to engage with a selected computing wheel by means of the handle 10, through the rod 52, as above described, a cam extension 151 fast on said rod (see Figs. 3, 3ª and 5) passes under the bail 86, and raises said bail (see Fig. 35), and thereby the bail 84 is raised above the rock arms 83 and 91, and, when so raised, they are moved back into effective positions over said rock arms by means of the spring 87, above described; so that the computing mechanism is restored from silenced condition to effective condition.

The bails 84 and 86 may be moved to inoperative positions at any time by means of the key or push-button 93, to which is fast a head 95 on the opposite end of spring plunger 94, in position to engage bail 84. This disconnects the computing mechanism from the typewriting machine. For returning the bails 84 and 86 to operative positions at will, a lever 96 is provided, the inner end of which underlies an arm of the zero-key bail 86. Depression of the handle or key of this lever will restore the bails 84 and 86 to operative position irrespective of the tabulating handle 10 when the master wheel 33 is in computing position. The computing carriage may be fed to the right by the key 122, without a corresponding shifting of the typewriter carriage, after the computing carriage has been positioned by the arm 10, the key 122 being arranged to underlie an arm 123 (see Fig. 4) fast on rock shaft 90, and rock said shaft 90 so as to operate the computing carriage escapement.

In order to prevent any error in the operation of the computing carriage escapement, when said carriage is moving to the left, after it has been positioned by handle 10, there is provided what is herein called an anti-backlash escapement (see Figs. 6, 19, 20, 24, 25, 28 and 29). Said escapement, which is operated by the rock shaft 90, comprises a fixed pawl 103 fast on said shaft, a swinging pawl plate 105 loosely pivoted at 105ª on an extension of said fixed pawl, and a swinging dog 104 which coöperates with fixed pawl 103 to feed the rack 102 along.

With every depression of a numeral key 68, as seen in Fig. 5, the rock shaft 90 is swung by a bail 84, as above described, so as to rock the loose dog 104 out of engagement with the tooth on rack 102, and to rock detent 103 into engagement with the adjoining tooth. As loose dog 104 is swung out of engagement with said rack (see Fig. 28), it is snapped by spring 109 to a position opposite the adjoining notch in said rack (see Fig. 24); and, on the return stroke of said numeral key, said rock shaft 90 swings back, carrying loose or feeding dog 104 into engagement with the adjoining tooth; and then said rack is drawn forward by means of spring 111, pressing loose pawl 104 along until pin 108 on pawl plate 105 stops the swinging of said pawl by means of a lug 107 on said pawl, when said rack has moved the space of one tooth.

It will be thus seen that when said rack is released from fixed pawl 103, it feeds along the space of one tooth after it contacts with loose pawl 104. When said rack 102 is drawn by setting rod 52, (so as to cause the master wheel to engage with computing wheels of higher denomination), and then released, said loose dog 104 is prevented from thus feeding forward the space of one tooth. This is acomplished by preventing spring 109 from drawing on said loose dog 104 during the adjustment of said rack effected by said setting rod 52.

For this purpose a spring 116 (see Fig. 25), during the shifting of the rack, presses to the left, in Fig. 6, a plunger 113, so as to force pawl plate 105 leftwardly by means of a pin 110 (see Fig. 25), working in a slot in said plate. This spring 116 is stronger than the spring 109 (shown in dotted lines in Fig. 25), and so will prevent said loose pawl or dog 104 from being drawn by said spring 109. Said plunger, however, is normally kept in ineffective position by means of an arm 121 on setting rod 52, which presses on one end of a lever 120 (see Figs. 4 and 24), whose opposite end, as seen in Fig. 6, catches on a collar 119 on said plunger 113, and so draws said plunger to the right as seen in Figs. 6 and 24, against the tension of spring 116, and in this way gives the spring 109 free play to normally operate said loose pawl 104.

When however, the setting rod 52 is swung by the tabulating handle, it is drawn clear of said lever 120, and thus allows spring 116 to force pawl plate 105 to the left, as seen in Fig. 6, into the position shown in Fig. 25, and prevents the swinging of the loose pawl 104 by means of spring 109. When said setting rod 52 is released, the loose pawl 104, as viewed in said Fig. 6, is at its extreme left-hand position (as shown in Fig. 25), so that when said setting rod 52 is released, the rack 102 is caught by said pawl as though it were a solid pawl. This prevents the lost motion which would normally take place in feeding rack 102 to the extent of one tooth on said rack, if it were not for said plunger 113.

In Figs. 16, 17, 18, 33 and 34, is shown a hand-lever 171, which can be used to manipulate the bails 84 and 86 in place of the push-button 93 and the levers 96 and 122. This may be accomplished by mounting the lever 171 so that it is movable in three directions to perform three separate functions. As shown herein, said lever is mounted on a plate 173, pivoted at 174 and carrying bearings 172 in which said lever swings in a vertical plane, while said plate 173 may swing in a horizontal plane. The rearwardly, upwardly-extending branch of the lever 171 has two arms 175 and 176, which embrace pins or projections 84ª and 86ª fast on the adjacent hubs of the bails 86 and 84, respectively. To raise said bails the lever 171 is raised, causing arm 175 to engage the pins 84ª and 86ª and swing the bails upwardly. To rock the bail 86 alone to operate the computing-machine carriage-rack, the lever 171 is depressed (as shown in Fig. 33), causing arm 176 to engage pin 84ª, while a bend in said arm 176 (see Fig. 34) carries it clear of pin 86ª, so that bail 84 is not operated by said lever 171 when depressed. To swing the bails 84 and 86 to the right, so that they drop into inoperative positions, the lever 171 is swung to the left so that it turns on pivots 174; and a side of said lever engages the pin 86ª of bail 86, moving said bails to the right and freeing them from the rock arms 91 and 83.

To release the typewriter carriage, a key 170 on a rock arm 169 may be depressed so as to raise the typewriter rack 160 out of the usual key-controlled escapement dogs seen at XX at Fig. 1, and thereby enable said carriage to be drawn to the left by its spring. The connections between the rock arm 169 and said escapement rack 160 include a rock arm 162 comprising a head 161 arranged to underlie said rack, a link 164 extending from said rock arm 162 (see Fig. 21) to rock arm 165, and a rock shaft 166 carrying a rock arm 168 joined by a link 167 to the key-lever rock arm 169.

When it is desired to operate the machine so as to perform a computation, and the numbers to be computed are to be arranged in a vertical column on the work-sheet, the stop 13ª and the locking bar 13 are moved to the Fig. 15 position, so as to connect the tabulating mechanism of the computing attachment and typewriter carriage to the tabulating handle 10. The handle is then moved leftward from its normal position, as seen in Fig. 2, until the pawl 16 thereon engages the tooth of the rack 20 corresponding to the highest denomination in the number to be computed. Said leftward movement of the tabulating handle 10 rocks the shafts 11 and 15 simultaneously, the latter through the intermediary of its connections, causing the stud 26 on the tabulator rack-bar 24 of the typewriter carriage to be moved into engaging relation with the stop 27 fast on said carriage, so as to arrest the carriage in a corresponding denominational position at the depression of the carriage-release key 170, (which is depressed while the handle 10 is still held in its actuated position). The rocking of the shaft 11 by the handle 10 causes the rod 52 to move leftwardly, as seen in Figs. 3 and 23, against the tension of its spring, through the intermediary of the arm 50 fast on said rock shaft, and the link 51. During said leftward movement of the rod 52, the arm 112 thereon engages the master-wheel carriage 99, 100, to move the master wheel 33 into engagement with that denominational element of the totalizer which corresponds to the tooth of the rack 20 with which the pawl 16 on the handle 10 is held in engagement.

Incidentally, during said leftward movement of the rod 52, the pin 132 thereon that is in engagement with the bell crank 128 will rock the latter and the lever 134, with its connected pawl 136, to rotate the ratchet wheel 137 (Fig. 37), to wind up the spring motor, in a manner presently to be described; and this power is subsequently to be used to rotate the master wheel at the depression of a numeral key.

For restoring the computing mechanism to effective condition, a cam 151, on rod 52, simultaneously with the denominational setting of the master wheel 33, engages the bail 86 (Fig. 3) to raise said bail at the leftward movement of the rod 52, and therewith the bail 84, so as to move said bails into engaging relation with the numeral keys of the typewriter, so that the computing mechanism may be actuated at the depression of said numeral keys.

After the tabulating handle 10 has been moved leftwardly, to control the movement of the typewriter carriage and master wheel to corresponding denominational positions, and to connect the computing mechanism with the typewriter, and to wind the spring motor of the computing mechanism, and after the carriage-release key 170 has been depressed, the tabulating handle 10 is retracted before the computation takes place. This return motion toward normal of the handle 10, moves the extension 112 on the rod 52 rightward and away from the master-wheel carriage 99, 100, so that the latter may move step by step rightwardly at the actuation of the numeral keys. The return to normal of the handle 10 also moves the lever 134 (Fig. 36) back to its normal position, so as to move the pawl 136 out of engagement with the teeth of the ratchet wheel 137, so that the spring motor of the computing mechanism may rotate to actuate the master wheel.

When it is desired to perform a computation of numbers which are not to be arranged in a vertical column on the worksheet, the typewriter carriage is moved either manually or otherwise, to its desired position. The locking bar 13, which is normally in engagement with the rock shaft 11, and out of engagement with the rock shaft 15, normally connects the rock shaft 11 with the tabulator handle 10, so that during the leftward movement of said handle, the rod 52 will be moved leftwardly to position the master-wheel carriage 99, 100 as aforesaid, but will not move the stud 26 of the typewriter carriage tabulating mechanism into engaging relation with the stop 27 of said carriage. The decimal tabulator handle 10 is then returned to its normal position before any of the numeral keys are depressed. The carriage-release key 170 is, however, not actuated when it is desired to position the master-wheel carriage 99, 100 denominationally without correspondingly positioning the typewriter carriage.

When it is desired to position the typewriter carriage by the handle 10 without correspondingly positioning the master-wheel carriage, the forward end of the coupling or locking bar 13 is depressed to its full extent, as seen in Fig. 26, to connect the tabulating handle 10 with the rock shaft 15 and disconnect said handle from the rock shaft 11. During the leftward movement of said handle 10 when in said Fig. 26 position, the stud 26 will be moved into engaging relation with the stop 27 of the carriage, said stud being moved a distance corresponding to the extent of motion of the handle 10. After the handle 10 has been positioned, so that its pawl 16 engages the tooth of the rack 20 corresponding to the highest denomination of the number to be computed, the carriage-release key 170 is depressed to release the carriage, so as to move its stop 27 into engagement with the stud 26, to arrest the carriage in a position corresponding to the position to which the decimal tabulator handle 10 has been moved.

If, during any operation of the handle 10 to actuate the typewriter carriage, the stop 27 thereof should stand at the left of the stud 26, as seen in Fig. 2, the typewriter carriage may be moved to the denominational position corresponding to the setting of the handle 10 without the depression of the carriage-release key 170, said typewriter carriage being moved manually rightwardly until the stop 27 thereon engages the stud 26. But said carriage is preferably moved to a position so that its stop 27 will stand at the right of the stud 26 before any tabulating action is performed, since it would be necessary to manually hold the handle 10 against accidental displacement if rightward pressure were applied to the stud 26 by the typewriter carriage stop 27.

In order to return the handle 10 from an actuated position to its normal position, the pawl 16 is released by manual pressure on the extension 19$^b$ of the lever 19$^a$ to which the pawl is pivoted, said pressure on 19$^b$ moving the pawl 16 (Fig. 27) out of engagement with the teeth of the rack 20, at which time the handle 10 may be freely moved in either direction. When moving said handle 10 leftwardly in a tabulating action, the extension 19$^b$ may be depressed at the option of the operator, to move the pawl 16 out of engagement with the teeth of the rack 20; but if this is not done, the pawl 16 will snap over the teeth of the rack 20 during said leftward movement of the handle.

After the typewriter carriage and master wheel have been moved to the desired position, the numeral key corresponding to the digit of highest denomination in the number to be computed, is depressed, at which time the associated indexing stop 65 is depressed into engaging relation with its counter-stop 59. Concomitantly the numeral key lever 68 depresses the bails 84 and 86, the depression of the former serving through its connections to rock the stop 70 and yoke 77, (Fig. 3$^a$), so as to connect the stop shaft 58, on which are fast the counter-stops 59, with the master-wheel shaft 34, and to move said escapement dog or stop 70 out of engagement with the tooth 72 of the escapement wheel, to release the spring motor to rotate the master wheel and therewith the index or stop shaft 58, until one of the counter-stops 59 thereon has come into engagement with the depressed indexing stop 65, to limit the rotation of the master wheel an extent corresponding to the value of the numeral key depressed.

The depression of the bail 84, through the intermediary of its connections, rocks the shaft 90 to actuate the master-wheel-escapement mechanism shown in Figs. 6, 19, 20, 24, 25 and 28, so that the master-wheel carriage 99, 100 and connected master wheel 33 will be moved one step rightward by its spring 111 during the up-stroke of the numeral key, in which position said master wheel will actuate the totalizer element of next lower denomination at the consequent depression of a numeral key.

This step-by-step motion rightward of the master-wheel carriage continues at the depression of the numeral keys until, after the depression of a numeral key in units denomination, the master-wheel carriage is moved one step toward the right of its units position, during which time an extension 126 thereon engages a stop or projection 127 (Fig. 3), fast on the bail 84 to move said bail rightwardly with the master-wheel carriage when said carriage moves rightward of its units position, and therewith the bail 86, against the tension of spring 87 so as to move said bails out of engagement with the arms 91 and 83 of the master-wheel carriage-escapement mechanism and master-wheel-releasing mechanism, at which time said bails will be free to drop out of engaging relation with the numeral keys, so that further actuation of the latter will not affect the computing mechanism.

To rewind the spring which rotates the master wheel, the tabulating handle 10 is employed. In swinging this handle 10 to set the computing machine carriage, as above described, the rod 52 is drawn to the left as viewed from in front. With every such motion the spring for driving the master wheel is wound up. This spring has one end fast to the shaft 135, while the opposite end is fast to the casing of the motor. The end fast to the shaft 135 is arranged to drive the master wheel by means of a ratchet wheel 145 fast on said shaft, and said ratchet wheel engages a pawl 146 fast on a gear wheel 147, which latter drives the master-wheel shaft through small gear 148, to which is fast a large gear 149, said gear 149 meshing with gear 69 fast on the shaft 34 of the master wheel.

There is formed fast on the shaft 135 a winding ratchet 137 to be engaged by a pawl 136, said pawl normally clear of said ratchet wheel, and being pivoted on a lever 134, which is swung every time the setting rod 52 is operated to set the computing machine carriage. The lever 134 is swung from the rod 52 by means of a fork 133, formed on one arm of a bell crank 128, of which the opposite arm 129 comprises a fork having a point 129$^a$ arranged to engage a pin 132 on said setting rod 52. When said rod 52 is drawn to the left, as viewed in Fig. 7, into the position shown in Fig. 23, the arm 129 of the bell crank swings to the left, causing the pawl 136 to be swung through the other arm of the bell crank. If rod 52 is given a long stroke, as seen in Fig. 23, the pin 132 will ride beyond the point 129$^a$, drawing point 129$^a$ onto the surface of a rib 130, from which rib said pin 132 projects, so that continued movement of the rod 52 will no longer move the bell crank 128, and therefore will no longer move the pawl 136. This insures that the pawl 136 shall not be given too great a throw by any excessive movement of the rod 52.

When rod 52 is returned to its normal position, the arm or point 129$^a$ of the fork is drawn back by a spring 131, so that said point 129$^a$ will pass into engagement with the pin 132, and thus positively engage the fork with the pin 132, so that the bell crank 128 will be swung on the next stroke of said rod 52. It will be seen from Figs. 23 and 36 that the arms 129$^a$ and 129$^b$ of the fork 129 are offset from each other. The rib 130, as seen in Fig. 23, extends to the pin 132, and the offsetting of the arm 129$^b$ is such that it will always ride on the top of the rib 130, while the arm 129$^a$ rides on the side of the rib.

In order to prevent the spring which drives the master wheel from being wound up too tight, a swinging arm 140 is arranged to raise the pawl 136 out of the driving ratchet 137, when the motor spring is nearly wound up, to the position seen in Fig. 36. To control this swinging arm 140, there is formed fast on the motor casing an internal gear 153 in which idly rides a pinion 154 shown in section in Fig. 38. Said pinion also meshes with an idle internal gear 143 of the same diameter as the gear 153, but having a number of teeth differing by one from said gear 153. The pinion 154 meshes with a gear 155 fast on the driving shaft 135. It will therefore be seen that when the driving shaft 135 turns, it will turn the idle pinion 154, and said pinion travels around in the fixed gear 153. The pinion will then cause the idle gear 143 in mesh with it to travel very slowly as the motor spring unwinds. In thus traveling, said idle gear moves a cam surface 144 formed integral therewith, so as to permit the swinging arm 140 to be drawn inward by means of a spring 138, which spring causes the pawl 136 to bear on the arm 140, by means of a pin 139 fast on an extension of said pawl.

When said cam surface has moved by the unwinding of the motor spring, into the position seen in Figs. 8 and 37, the pawl 136 is in position to wind up the motor spring through the winding ratchet every time the rod 52 is operated, but, as the spring is gradually wound up, the cam 144 will travel around, so as to move said swinging arm 140 outwardly, and thus raise the pawl 136 away from the winding ratchet 137. When so swung outwardly, any movement of the rod 52 will merely cause the pawl 136 to move idly. It will therefore be seen that it is impossible to wind up the motor spring too tight if the parts are properly set. A spring pawl 69ª, (Fig. 3), bearing on the teeth of the wheel 59 prevents backward turning of said wheel during the operation of winding.

The dial wheels 31 mesh with computing wheels 32 loose on shaft 32ª, and said computing wheels are engaged successively by the master wheel or driver 33, as it is fed laterally by means of the carriage 99. The dial wheels are held normally positively locked against being turned, (see Fig. 10), by means of a locking lever $a$ comprising a cam extension 35. Said cam extension comprises a point which positively locks the wheels, as just described, in one direction, but in the opposite direction said lever $a$ is arranged to be pushed aside by means of the teeth on carrier wheels 32, so that said carrier wheels 32 may be easily turned in reverse direction. This enables them to be easily set by a zero-setting device.

Said locking levers $a$ are also arranged to effectively aline the carrier wheels and through them the dial wheels. For this purpose each of said levers is normally drawn against its carrier wheel by means of a spring 36 (as shown in Fig. 10), which holds the point of the lever between said teeth, and so centers said wheel if the master wheel has not left it exactly in the proper position.

Said alining and locking levers $a$ are arranged to be pushed out of mesh with their carrier wheels *seriatim* (as seen in Fig. 30), by an extension 99ª of the carriage part 100, which moves with said master wheel laterally; said arm 99ª being cam-shaped and arranged to push aside the locking lever $a$ with which it is about to be engaged, as the carriage 99 travels along. Thus it will be seen that every carrier wheel, and consequently every dial wheel, will be held locked by its alining and locking lever unless engaged by the master wheel, and that the master wheel, between the torque of the driving motor and the stop 70, always holds positively in place that computing wheel with which it is momentarily engaged. Therefore, the dial wheels are always effectively held in position.

When, during the actuation of any dial wheel 31 by the master wheel, the numeral "9" on said dial wheel passes the sight opening in the totalizer casing, a shoulder or cam 45 on the gear wheel 32 associated with said dial wheel will trip a trigger lever $c$, to initiate a tens-carrying action, which will be completed by power other than that used to drive the master wheel, namely, the power of the spring 36.

In Fig. 10 is shown a computing or carrier wheel and associated parts in normal position; and in Fig. 9 said parts are shown just after a carry-over has been made, while Fig. 29 shows the beginning of a carry-over operation. Each carry-over wheel 32 is provided with a shoulder 45 (best shown in Fig. 31), which trips a trigger lever 46 (as shown in Fig. 29), so that a carrying lever $b$, which was held in the position seen in Fig. 10, by means of a pin 41 catching in a cam ledge 43 on said trigger lever, is released.

In being so released, it is drawn by spring 36 into the position shown in Fig. 9; and said carrying lever is of such length that, in so moving, it will, by means of the drive-pawl 40 pivoted thereon, turn the carrier wheel 32 one-tenth of a revolution, thus making a carry-over.

For the purpose of insuring proper operation, the end 39 of the carrying lever $b$ is arranged to lock in the notch of said carrier wheel 32, and so serves as a detent to hold said wheel locked against overthrow or other accidental movement.

To release the alining and locking lever $a$ for the carry-over operation to take place, said carrying lever $b$ is provided with an arm 37, which strikes (see Fig. 29) an extension 38 of the alining and locking lever $a$ and swings said lever to inoperative position.

The trigger or releasing lever 46 is normally held in position to contact with the hub of carrier wheel 32, by means of a spring 46ª. The carry-over mechanism is reset to normal position, as seen in Fig. 10, by means of the operation of the tabulating handle 10. For this purpose rod 52, which returns the computing machine carriage as above described, carries a fin 53, on which an arm of a lever 54 is arranged to ride up, to rotate a shaft 47 (to the position shown in Fig. 30), by means of rock arm 56 fast on said shaft, and a link 55 extending from said rock arm to said lever 54. In so rotating, the shaft 47 moves a pin 49 fast on it, so as to strike against the hub of carrying lever $b$ and raise said lever, so that pin 41 catches in the cam projection 43 of the trigger lever $c$, thus restoring the parts to normal positions. The lever 40 is positively moved to horizontal position, as seen in Fig. 10, by its pin 42, which strikes a cam 44 on the trigger lever 46.

It will be observed that the springs 36 constantly tend to carry over, and are restrained by the trigger levers, so that the springs 36 constitute a source of power for operating the carry-over devices, and therefore relieve the master wheel from any strain due to carrying over a long string of nines.

In order to give the necessary freedom of action to the carrying levers $b$, so that the carry-over operation may take place, the pins 49 work in slots 48 in the hubs of said levers $b$. In order that said shaft 47 may never have an excess throw, the lever 54, as described, rides up on a fin 53 (as best shown in Fig. 35), so as to always swing a uniform amount, no matter how far the rod 52 may be shifted. On the return stroke a pin 57 is arranged to catch behind said lever 54 and positively move it to the position seen in Fig. 11.

When the decimal tabulator handle 10 is moved leftwardly after the performance of a computation and prior to the performance of a following computation, at which time the rod 52 will also be moved leftwardly, the fin or ledge 53 formed on said rod will ride under a lever 54 to rock said lever and connected parts, to rock the shaft 47 which is mounted lengthwise of the totalizer (Figs. 9, 10, 29, 30, 31) to retract the tens-carrying mechanism to its normal position and store power in the spring 36, ready for any tens-carrying action.

Variations may be resorted to within the scope of the invention, and portions of the improvements may be used without others.

Having described my invention what I claim and desire to secure by Letters Patent is:

1. In a typewriter provided with a computing mechanism, the combination comprising a series of letter and figure types, keys with connections for actuating said types, a carriage, mechanism controlled by each of said keys for moving said carriage letter space distances, a computing mechanism including a member adapted to be actuated from denomination to denomination and for figure values under the control of each of the figure keys, a series of indicator wheels, a series of carrying wheels in mesh with the indicator wheels, carrying devices operating on said carrying wheels, a source of power controlled by the figure keys for actuating the carrying wheels, and a source of power independent of that controlled by the figure keys for actuating the carrying devices.

2. In a combined typewriting and computing machine, the combination with a series of letter and figure types, keys with connections to said types, a carriage, and mechanism for moving the carriage adapted to be actuated letter space distances under the control of each of said keys, of a computing mechanism including a plurality of indicators, a driver, means for effecting a relative denominational movement between the indicators and driver, means controlled by the figure keys for actuating the driver figure value distances, carrying devices, a power mechanism for moving the carrying devices under the control of the figure keys, and means connected to operate automatically at the normal operation of a part of said machine, for restoring said moving mechanism.

3. In a typewriter provided with computing mechanism, the combination with a series of figure keys, of a computing mechanism including a member adapted to be actuated denominational and figure value distances under the control of the figure keys, a wheel, a holding lever, a carrying lever, said levers being arranged to coöperate alternately with the wheels, and a common spring connecting and operating said levers.

4. In a typewriter provided with a computing mechanism, the combination with a series of figure keys, of a computing mechanism including a plurality of indicator wheels, a plurality of carrying wheels meshing with said indicator wheels, a member adapted to be actuated under the control of the figure keys from denomination to denomination and to move the indicator wheels figure value distances, power devices for moving said member figure value distances, said power devices including a trigger lever arranged to be operated once in the revolution of one of said carrying wheels, and a carrying lever coöperating with the adjacent carrying wheel, said trigger lever having a shoulder 43 and a curved surface 44 and said carrying lever having a dog provided with pins 41 and 42 and adapted to engage said shoulder and curved surface respectively.

5. In a typewriter provided with a computing device, the combination with a series of figure keys, of a computing mechanism, including a member adapted to be actuated denominational and figure value distances under the control of each of said figure keys, a carrying wheel, a holding lever, and a carrying lever, said levers being arranged to alternately engage the carrying wheel.

6. In a combined typewriting and computing machine, the combination with a series of figure keys, of a computing mechanism including a member adapted to be actuated denominational and figure value distances under the control of the figure keys, a common power mechanism for producing all of said figure value movements, a series of wheels, a corresponding series of carrying levers, a corresponding series of trigger levers arranged to hold the carrying levers from engagement with the wheels, and means for simultaneously engaging all the carrying levers with the trigger levers, said engaging means connected to operate automatically at the normal operation of a part of said machine.

7. In a combined typewriter and computing mechanism, the combination with a series of figure keys, of a computing mechanism including a member adapted to be actuated under the control of the figure keys from denomination to denomination and for figure values, a series of wheels, a series of carrying levers each adapted to actuate one of said wheels, a rock shaft upon which said carrying levers are mounted, means for engaging said levers with said rock shaft to simultaneously move them from the wheels, and means for temporarily holding the carry-levers from engagement with the wheels.

8. In a machine of the class described, a computing mechanism including a series of indicators, a series of trigger levers having shoulders 43, a series of carrying wheels each provided with a projection arranged to operate a trigger lever, a series of carrying levers each having a projection adapted to engage the shoulder of its corresponding trigger lever, a rock shaft supporting said carrying levers, and pins on said shaft adapted to engage shoulders on the carrying levers, whereby the carrying levers may be moved into engagement with the trigger levers by the rocking movement of said shaft.

9. In a machine of the class described, a computing mechanism including a member adapted to be moved denominational and figure value distances under the control of each of the figure keys, a series of carrying wheels, a series of carrying levers, a series of trigger levers, and a rock shaft engaging the carrying levers and adapted to move them into engagement with the trigger levers, an operating lever adapted to be set before adding each number, and connections between said rock shaft of the computing mechanism and said operating lever for the purpose set forth.

10. In a machine of the class described, the combination with a series of letter and figure types, keys with connections for actuating the type, a carriage, and mechanism controlled by the keys for moving the carriage, of a computing mechanism including indexing devices operated under the control of the figure keys, means for setting said mechanism to add a number having a given number of figures, and means for automatically rendering said figure keys inoperative on the indexing devices, after the completion of the computation of the unit digit in each number.

11. In a machine of the class described, the combination with a computing mechanism operated under the control of figure keys and comprising a series of indicator wheels, and a driver, said wheels and driver being movable relatively to each other, of means for advancing the denominationally adjustable member of the computing mechanism step by step, means for intermittently rotating said driver, and means for automatically throwing said driver operating mechanism out of action after it has operated the units indicator wheel for each number.

12. In a computing mechanism, the combination of a series of figure keys, a bail operated by said keys, an escapement operated by the bail, and means for automatically disengaging the bail from the escapement device after the last figure key for a number has been operated.

13. In a computing mechanism, the combination of a driver, a feed rack connected thereto, a rock shaft, pawls carried by the rock shaft and coöperating with the feed rack, a bail, and means for connecting and disconnecting said bail automatically with said rock shaft, for the purpose set forth.

14. In a computing mechanism, the combination of a feed rack, a rock shaft, pawls carried by the rock shaft and coöperating with the rack, a fixed arm on said shaft, a pivotally mounted bail, a spring normally holding said bail in engagement with said arm, and manually operated means for disengaging said bail and arm at will.

15. In a computing mechanism, the combination of a feed rack, a rock shaft, pawls carried by the rock shaft and coöperating with the rack, a fixed arm on said shaft, a pivotally mounted bail, a spring normally holding said bail in engagement with said arm, and manually operated means for engaging said bail with said arm at will.

16. In a computing mechanism, the combination of a feed rack, a rock shaft, pawls carried by the rock shaft and coöperating with the rack, a fixed arm on said shaft, a pivotally mounted bail, a spring normally holding said bail in engagement with said arm, and means for automatically engaging and disengaging said bail respectively before and after adding a number on the machine.

17. In a computing mechanism, the combination of a driver feed rack, a rock shaft, pawls carried by the rock shaft and coöperating with the said rack, a series of figure keys, a bail engaged only by the zero key, and a second bail operated by the remaining figure keys, said second bail engaging the zero bail whereby the latter is operated from each key and said bails being adapted to operate said rock shaft, for the purpose described.

18. In a computing mechanism, the combination with a driver feed rock shaft, 90, and a driver controlling rock shaft, 82, in line therewith, of a series of figure keys, and connections by means of which all of said figure keys excepting the zero key operate both rock shafts, said zero key being arranged to operate only the driver feed rock shaft.

19. In a computing mechanism, the combination with a series of indicator wheels, of a driver, one of said elements being movable denominationally relative to the other, an operating lever, connections between said operating lever and said denominationally movable member whereby the latter is located by the former with reference to the other said element, a feed rack, fixed and movable pawls coöperating therewith, a stop for rendering said movable pawl inoperative, and a connection between said stop and said operating lever whereby said stop is brought into action while the denominationally movable element is being set, for the purpose set forth.

20. In a machine of the class described, an actuating motor, a rewinding device for the motor comprising a lever 128, a reciprocating rod 52, and a rib on said rod arranged to impart a constant movement to said lever for different movements of the rod.

21. The combination of a typewriting machine, a computing mechanism, an operating lever for setting the denominationally adjustable element of said computing mechanism for any given number, a vertical shaft upon which said lever is mounted, a rod mounted on the typewriter and provided with an adjustable stop, a second shaft mounted on the typewriter and in line with the first said shaft, means for coupling said shafts, and means connecting said second shaft with said stop rod, whereby said carriage stop and denominationally adjustable element of the computing mechanism are simultaneously adjusted.

22. In a computing mechanism, the combination of the driver, shaft 34 on which said driver is mounted, the variable stop rock shaft 58 in line with said driver shaft, the rock shaft 71 having arms arranged to connect and disconnect the aforesaid shafts, the figure keys, and the connections by means of which said rock shaft 71 is operated each time a figure key is depressed.

23. In a machine of the character described, the combination with the figure keys, of the rock shafts 82 and 90, the bail 84 arranged to rock said shaft 82, and the bail 86 arranged to rock said shaft 90, said bail 86 being arranged to be operated independently and also by the bail 84, for the purpose set forth.

24. In a machine of the class described, the combination with the setting device, and the reciprocating rod 52 operated thereby, of a series of carrying wheels, carrying levers for operating said wheels, and means for setting said levers comprising an elbow lever and a rib on said reciprocating rod, said rib operating said lever a constant amount each time the rod is reciprocated.

25. In a machine of the class described, the combination of a series of indicator wheels, a driver adapted to actuate said wheels, said wheels and driver being relatively adjustable denominationally, the setting lever, the bails 85 and 86, means for throwing said bails out of action after each number is added, and a part 151 movable by said setting device and arranged to restore said bails to operative position each time the mechanism is reset, for the purpose set forth.

26. In a combined typewriter and computing machine, the combination with the typewriter carriage and printing mechanism, including letter and figure type, keys, and connections between the type and keys, of a plurality of indicators, a driver, means controlled by the figure keys for effecting a relative denominational movement between the indicators and driver in synchronism with movements of the typewriter carriage, a controller for determining the beginning of each series of denominational movements of the denominationally adjustable element of the computing mechanism, and means for automatically disengaging the connection between the figure keys and the computing mechanism when the said denominationally adjustable element has reached the limit of movement.

27. In a combined typewriter and computing machine, the combination with the typewriter carriage and printing mechanism, including letter and figure type, keys, and connections between the type and keys, of a plurality of indicators, a driver, means controlled by the figure keys for moving the driver denominationally relative to the indicators, a controller for determining the beginning of the denominational movements of the driver required to register a number, and means for disengaging the connection between the driver and figure keys when the driver has reached the limit of the series of denominational movements.

28. In a combined typewriter and computing machine, the combination with the typewriter carriage and printing mechanism, including letter and figure type, keys, and connections between the type and keys, of a plurality of indicators, a driver, means controlled by the figure keys for effecting a relative denominational movement between the indicators and driver in synchronism with movements of the typewriter carriage, means controlled by the figure keys for actuating the driver figure value distances in any of its several denominational relations to the indicators, a controller for determining the beginning of each series of denominational movements of the denominationally adjustable element of the computing mechanism, and means for automatically disengaging the connections between the figure keys and the computing mechanism as the driver is actuated at the limit of movement.

29. In a typewriter provided with a computing mechanism, the combination with a series of letter and figure types, and keys with connections for actuating said types, of a computing mechanism including a member adapted to be actuated from denomination to denomination under the control of each of the figure keys, and a controller for controlling and determining variable movements of the said adjustable member of the computing mechanism.

30. In a combined typewriter and computing machine, the combination with the typewriter carriage and printing mechanism, including letter and figure type, keys, and connections between the type and keys, of of a plurality of indicators, a driver, connections controlled by the figure keys for transmitting figure value movements to the driver, and means for automatically moving an element of said connection to an inoperative position to permit the keys to be operated without affecting the driver.

31. In a combined typewriter and computing machine, the combination with the typewriter carriage and printing mechanism including letter and figure type, keys, and connections between the type and keys, of a plurality of indicators, a driver, means controlled by the figure keys for effecting a relative denominational movement between the indicators and driver in synchronism with the movement of the typewriter carriage, means controlled by the figure keys for actuating the driver figure value distances in any of its several denominational relations to the indicators, and means for automatically moving an element of the connections between said figure keys and driver to an inoperative position to permit the keys to be operated without affecting the driver.

32. In a combined typewriter and computing machine, the combination with the typewriter carriage and printing mechanism, including letter and figure types, keys, and connections between the type and keys, of a plurality of indicators, a driver, means controlled by the figure keys for effecting a relative denominational movement between the indicators and driver in synchronism with the movement of the typewriter carriage, means controlled by the figure keys for actuating the driver figure value distances in any of its several denominational relations to the indicators, and means for automatically moving an element of the connections between said figure keys and driver to an inoperative position to permit the keys to be operated without affecting the driver following the actuation of the units indicator by the driver.

33. In a typewriter provided with a computing mechanism, the combination with a series of letter and figure types, keys with connections to said types, a carriage, and mechanism for moving the carriage adapted to be actuated letter space distances under the control of each of said letter and figure keys, of a computing mechanism including a member adapted to be actuated from denomination to denomination and for figure values under the control of each of the figure keys while writing numbers which are to be added and not actuated while writing numbers which are not to be added, means for setting said member of the computing mechanism backward in accordance with the number of figures to be added, means for operatively connecting the figure keys with said computer, and a controller for disconnecting the same when the proper number of figures have been written.

34. In a typewriter provided with a computing mechanism, the combination with a series of letter and figure types, keys with connections to said types, a carriage, and mechanism for moving the carriage adapted to be actuated letter space distances under the control of each of said letter and figure keys, of a computing mechanism including a member adapted to be actuated from denomination to denomination and for figure values under the control of the figure keys while writing numbers which are to be added and not actuated while writing numbers which are not to be added, means for setting said member of the computing mechanism backward and connecting the same to the figure keys, a series of teeth for regulating the backward setting of said member of the computing mechanism, means to advance said member by the figure keys, and means to discontinue said connection between the figure keys and computing mechanism when it has advanced the proper number of said teeth.

35. In a typewriter provided with a computing mechanism, the combination with a series of letter and figure types, keys with connections to said types, a carriage, and mechanism for moving the carriage adapted to be actuated letter space distance under the control of each of said letter and figure keys, a computing mechanism including a traveling member adapted to be actuated from denomination to denomination for figure values under the control of each of the figure keys while writing numbers which are to be added and not actuated while writing numbers which are not to be added, means for setting said traveling member of the computing mechanism backward, a key controlled step by step escapement device for said traveling member, means to operatively connect said escapement device and the said traveling member of the computing device to the figure keys in accordance with the number of figures required to be written, means to return said traveling member to its starting position by the figure keys, and means to disconnect the said keys when the said traveling member has reached its starting position.

36. In a combined typewriting and computing machine, the combination with computing mechanism, a carriage, a platen, letter type, keys connected with said type, and figure type, of figure keys adapted to control both the type writing and computing mechanisms while writing figures, the said figure keys being adapted to be used in writing both numbers which are to be added and numbers which are not to be added, tabulating mechanism for rendering any desired denomination of the computing mechanism operative and for positioning the carriage of the typewriter at the corresponding denominational position, including means for setting the denominationally movable member of the computing mechanism backward and connecting the same to the figure keys by the actions of said tabulator, means to advance said member of the computing mechanism denominationally by the figure keys, and means to automatically discontinue said connection when it has advanced a number of teeth corresponding to said backward movement.

37. In a combined typewriter and computing machine, the combination of a computing mechanism including a plurality of indicators, a driver, means for effecting a relative denominational movement between the indicators and driver, carrying devices including a plurality of levers each adapted to be rocked and effect a movement of one of the indicators during a predetermined movement of the indicator of next lower order, means normally holding each of said levers in position to actuate its corresponding indicator when rocked as aforesaid, and means for restoring to such normal position any levers which have been actuated including a member movable in the direction of said denominational movement.

38. In a combined typewriter and computing machine, the combination of a computing mechanism including a plurality of indicators, a driver, means for effecting a relative denominational movement between the indicators and driver, carrying devices including a plurality of levers each adapted to be rocked and effect a movement of one of the indicators during a predetermined movement of the indicator of next lower order, means normally holding each of said levers in position to actuate its corresponding indicator when rocked as aforesaid, and means for restoring to such normal position any levers which have been actuated including a rock shaft having means for engaging all of said levers, and an arm connected with said shaft and adapted to be actuated by the movement in one direction of a member arranged to move to and fro parallel to the direction of said denominational movement.

39. In a combined typewriter and computing machine, the combination of a computing mechanism including a plurality of indicators, a casing for the indicators, a driver, means for effecting a relative denominational movement between the indicators and driver, carrying devices including a plurality of levers each adapted to be rocked and effect a movement of one of the indicators during a predetermined movement of the indicator of next lower order, means normally holding each of said levers in position to actuate its corresponding indicator when rocked as aforesaid, means for restoring to such normal position any levers which have been actuated during the operation of the computing mechanism in registering a number and including a member extending to the outside of said casing, and means for actuating said member movable to and fro in a path parallel to the direction of said denominational movements.

40. In a combined typewriter and computing machine, the combination of a computing mechanism including a plurality of indicators, a driver, means for effecting a relative denominational movement between the indicators and driver, carrying devices including a plurality of levers each adapted to be rocked and effect a movement of one of the indicators during a predetermined movement of the indicator of next lower order, means normally holding each of said levers in position to actuate its corresponding indicator when rocked as aforesaid, means for positively rocking and restoring to normal position such of said levers as have been actuated during the registration of a number by the computing mechanism, and a device for actuating said means which is bodily moved relative to the computing mechanism in the direction of said denominational movements, as an incident to the operation of varying the relative positions of the indicators and driver prior to registering a subsequent number.

41. In a combined typewriter and computing machine, the combination, of a computing mechanism including a plurality of indicators, a driver, means for effecting a relative denominational movement between the indicators and driver, carrying devices including a plurality of levers each adapted to be rocked and effect a movement of one of the indicators during a predetermined movement of the indicator of next lower order, means normally holding each of said levers in position to actuate its corresponding indicator when rocked as aforesaid, and means for restoring to such normal position any levers which have been actuated including a rock shaft, means projecting radially from said shaft and adapted to directly engage such of said levers as have been actuated during the registration of a number of the computing mechanism, and means for rocking said shaft, which means are actuated as an incident to the operation of varying the relative positions of the indicators and driver prior to registering a subsequent number.

42. In a combined typewriter and computing machine, the combination, of a computing mechanism including a plurality of indicators, a casing for the indicators, a driver, means for effecting a relative denominational movement between the indicators and driver, carrying devices including a plurality of levers each adapted to be rocked and effect a movement of one of the indicators during a predetermined movement of the indicator of next lower order, means normally holding each of said levers in position to actuate its corresponding indicator when rocked as aforesaid, means for restoring to such normal position any levers which have been actuated during the operation of the computing mechanism in registering a number and including a rock shaft mounted in said casing and having radially projecting means for engaging said levers, a movable device the position of which is varied as an incident to the operation of varying the relative position of the indicators and driver prior to registering a subsequent number, and means connected with the rock shaft and extending into the path of movement of said device.

43. The combination with a computing device and an actuator therefor, of numeral keys, operative connections between the keys and actuator, said connections including a part shiftable to two positions in one of which said keys are connected with said actuator and in the other of which said keys are disconnected from said actuator, and means for automatically moving said part to its disconnecting position.

44. In a computing machine, the combination of a series of registering elements, a single group of keys common to said registering elements, an actuator, means for bringing said actuator into action on said elements one after another to register a number, operative connections between said keys and said actuator, said connections including a part shiftable to two positions in one of which said keys are connected with said actuator and in the other of which said keys are disconnected from said actuator, and means for automatically moving said part to its disconnecting position at the end of the registration of a number.

45. In a combined typewriting and computing machine, the combination with the keys and printing instrumentalities of a typewriter, said keys including numeral keys, of computing mechanism including a series of registering elements, an actuator, means for bringing said actuator into action on one after another of said registering elements, connections between said numeral keys and said actuator, said connections including a part shiftable to two positions in one of which said keys are connected with said actuator and in the other of which said keys are disconnected from said actuator, and means for automatically moving said part to its disconnecting position at the end of the registration and printing of a number.

46. In a combined typewriting and computing machine, the combination with a traveling carriage, numeral keys and an array of computing wheels, of a master wheel for operating said computing wheels *seriatim*, a tabulating device for positioning said traveling carriage, and means controlled by the operation of said tabulating device for connecting said numeral keys to said master wheel.

47. In a combined typewriting and computing machine, the combination with a traveling carriage, numeral keys and an array of computing wheels, of a master wheel for operating said computing wheels *seriatim*, and a denomination selector comprising a handle and a scale for positioning said master wheel to engage with any selected computing wheel at any letter space in the travel of said carriage.

48. In a combined typewriting and computing machine, the combination with a traveling carriage, numeral keys and an array of computing wheels, of a master wheel for operating said computing wheels *seriatim*, a decimal tabulating device for positioning said traveling carriage, means controlled by the operation of said tabulating device for connecting said numeral keys to said master wheel, and means for positively breaking said connection when said master wheel passes the units computing wheel.

49. In a combined typewriting and computing machine, the combination with a traveling carriage, numeral keys and an array of computing wheels, of a master wheel for operating said computing wheels *seriatim*, a tabulating device for positioning said traveling carriage, means for positioning said master wheel to engage with a selected computing wheel, and means for coupling at will said tabulating device to said master wheel positioning device.

50. In a combined typewriting and computing machine, the combination with a typewriter carriage, numeral keys, and an array of computing wheels, of a master wheel for operating said computing wheels seriatim, a computing machine carriage controlling the denominational relation of said master wheel and computing wheels, a tabulating device for positioning said typewriter carriage, and means for connecting said tabulating device to simultaneously position said computing machine carriage.

51. In a combined typewriting and computing machine, the combination with a typewriter carriage, numeral keys, and an array of computing wheels, of a master wheel for operating said computing wheels seriatim, a tabulating device for positioning said traveling carriage, means connected to said tabulating device for simultaneously positioning said master wheel, and means for independently feeding said master wheel letter-space distances.

52. A computing machine having a tabulating mechanism combined with a typewriting machine to position the typewriter carriage and the computing carriage simultaneously, or to position either carriage independently of the other, at will.

53. The combination with a typewriting machine, including a frame, printing mechanism, a movable carriage, and tabulating mechanism for arresting the carriage at a plurality of points in a single traverse of the frame by said carriage, of a computing device, and means associated with the tabulating mechanism for successively establishing an operative relation between the computing device and the printing mechanism.

54. In a computing machine, the combination with numeral keys and computing wheels, of a master wheel for operating said computing wheels seriatim, a source of power constantly tending to turn said master wheel, a shaft adjacent said numeral keys, stops on said shaft one for each numeral key, a stop moved by the key operated into the path of the stop on the shaft, a dog normally holding said master wheel against rotation, and means operated by said depressed key for moving said dog to ineffective position and connecting said shaft to said master wheel.

55. In a computing machine, the combination with numeral keys and computing wheels of a master wheel for operating said computing wheels seriatim, a source of power, a shaft for controlling said master wheel, stops on said shaft, means for connecting said shaft to said master wheel so that said wheel will be driven by said source of power until said shaft is arrested by one of said stops, and means controlled by the numeral keys for arresting said shaft by said stops.

56. In a computing machine, the combination with numeral keys and computing wheels, of a master wheel for operating said computing wheels seriatim, a source of power constantly tending to turn the shaft of said master wheel, a second shaft forming a continuation of said first shaft, stops on said second shaft, one for each numeral key, a stop moved by the key operated into the path of the stop on said shaft, a dog normally holding said master wheel against rotation, means operated by the depression of said key for moving said dog to ineffective position and connecting said shafts to revolve as a unit, and means operated by the return of said key for causing said master wheel to engage the adjacent computing wheel.

57. In a computing machine, the combination with numeral keys and computing wheels, of a zero key, a master wheel arranged to engage said computing wheels seriatim, an escapement device for causing said master wheel to feed to so engage said wheels, a source of power to turn said master wheel, a shaft arranged to be connected to said master wheel to determine how far it shall rotate, a universal member moved by each numeral key except the zero key for causing the operation of said escapement and connecting said shaft to said master wheel, and a member operated by said zero key for causing the operation of said escapement device without operating said connection.

58. In a computing machine, the combination with numeral keys and computing wheels, of a master wheel for operating said wheels seriatim to an extent determined by said numeral keys, carry-over devices connected with said computing wheels for turning each wheel from the one lower in denomination, and power means for so turning said wheels as controlled by said carry-over devices, said power means being distinct from the power that drives the master wheel.

59. In a combined typewriting and computing machine, the combination with numeral keys and a gang of computing wheels, of means for simultaneously positioning said carriage and coupling said keys to said wheels in any one of several columns, and means for automatically uncoupling said wheels and keys when a number has been completely recorded in any of said columns.

60. In a combined typewriting and computing machine, the combination with numeral keys and a gang of computing wheels, of a tabulating device for said typewriter for simultaneously positioning said carriage and coupling said keys to said wheels in any one of several columns, and means for automatically uncoupling said wheels and keys when a number has been completely recorded in any of said columns.

61. In a computing machine, the combination with numeral keys and computing wheels, of a master wheel for operating said wheels *seriatim* to an extent determined by said numeral keys, carry-over devices connected with said computing wheels for turning each wheel from the one lower in denomination, a source of power for turning said master wheel, and a separate source of power controlled by said carry-over mechanism for causing said computing wheels to be turned thereby.

62. In a combined typewriting and computing machine, the combination with numeral keys and computing wheels, of a lock for each computing wheel, a carry-over mechanism, means on the carry-over mechanism for unlocking each wheel when it is turned by said carry-over mechanism, and a lock for holding it against overthrow after it has been operated by the carry-over mechanism.

63. In a combined typewriting and computing machine, the combination with numeral keys and computing wheels, of a master wheel arranged to successively engage said computing wheels to turn them, a lock for each computing wheel, a carry-over mechanism, means on the carry-over mechanism for unlocking each wheel when it is turned by said carry-over mechanism, a lock for holding it against overthrow after it has been operated by the carry-over mechanism, and means for setting said carry-over locks by the positioning of the master wheel.

64. In a computing machine, the combination with numeral keys and computing wheels, of means for turning said wheels *seriatim* to an extent determined by said keys, carry-over devices, power means for operating said carry-over devices, and a lock for positively arresting each wheel against overthrow after it is turned by a carry-over device.

65. In a combined typewriting and computing machine, the combination with a traveling carriage, numeral keys and computing wheels, of a tabulating mechanism for positioning said carriage, means for connecting said numeral keys to said computing wheels when the carriage is so positioned, a motor for driving said computing wheels, and means controlled by said tabulating mechanism for making said motor effective when said mechanism is operated.

66. In a combined typewriting and computing machine, the combination with a traveling carriage, numeral keys and computing wheels adapted to be controlled by said keys, of a stop on said carriage, a cooperating tabulating stop on the frame of the machine and normally out of the path of said carriage stop, means for shifting said frame stop into the path of said carriage stop, and means for simultaneously connecting said keys to said wheels to control them.

67. In a combined typewriting and computing machine, the combination with numeral keys and computing wheels, of a typewriter carriage, a separately settable adding machine carriage, means for simultaneously positioning the carriages to an identical denomination in any of several given columns and to connect said keys to said wheels, and means for breaking said connection when a number is completely recorded in any column.

68. In a combined typewriting and computing machine including a typewriter carriage having a letter-feeding device, the combination with numeral keys and a denominational array of computing wheels, of a denominational selector for said wheels, a handle or finger piece for setting said selector so that a number written in any position on the carriage of the typewriter will be recorded in the correct denominational wheels of said mechanism, and separate feeding means for giving said selector a step-by-step movement.

69. In a combined typewriting and computing machine, the combination with numeral keys and computing wheels, of a typewriter carriage having a letter-feeding device, a computing machine carriage, a handle or finger piece for positioning said computing machine carriage in any desired relation to said typewriter carriage, and separate feeding means for giving said computing carriage a step-by-step movement.

70. In a combined typewriting and computing machine, the combination with numeral keys and computing wheels, of a typewriter carriage, having a letter feeding motion, a computing machine carriage having an independent letter feeding motion in the opposite direction, and a handle or finger piece for positioning said computing machine carriage in any desired relation to said typewriter carriage.

71. In a combined typewriting and computing machine, the combination with numeral keys and computing wheels, of a typewriter carriage having a letter feeding motion, a computing machine carriage having an independent letter feeding motion in the opposite direction, and a handle or finger piece for positioning said computing machine carriage in any desired relation to said typewriter carriage, the connection between said carriages and said finger piece being arranged to position said carriages to identical denominational positions in whichever direction the typewriter carriage may move.

72. In a combined typewriting and computing machine, the combination with a traveling carriage, numeral keys and computing wheels, of a master means for actuating said wheels *seriatim* to an extent determined by said keys, means including a part moving bodily step by step at the operation of the keys for establishing the connection between said master means and keys by positioning said carriage, and means for breaking said connection at will.

73. The combination with a traveling carriage and an adding mechanism mounted in fixed relation relative to the transverse travel of said carriage, operating keys for said adding mechanism normally out of coöperation therewith, a tabulating mechanism controlling the movement of said carriage, and means associated with said tabulating mechanism to bring the keys and adding mechanism into coöperative relation with each other.

74. The combination with a traveling carriage, type keys and printing devices, of a typewriter with adding mechanism, an actuating device therefor adapted to be controlled by certain of said keys, but normally out of coöperation with said keys, adjustable means for automatically bringing said keys and actuating device into coöperative relation with each other at any desired point in the movement of said carriage, and a tabulating mechanism controlling the movement of said carriage.

75. The combination of a traveling carriage, operating keys and printing devices, a plurality of adding wheels mounted in fixed position relative to the transverse movement of said carriage, a tabulating device for said carriage, an actuating device for the adding wheels normally out of coöperative relation with the operating keys, and means for bringing the actuating device and operating keys into coöperative relation with each other by operation of said tabulating device.

76. The combination with a traveling carriage, type keys and printing devices of a typewriter, of a plurality of adding wheels mounted in fixed position relative to the travel of said carriage, an actuating device for the adding wheels adapted to be controlled by certain of said type keys, but normally out of coöperative relation with said keys, a denominational tabulating device, and means associated therewith for bringing said type keys and actuating device into coöperative relation with each other.

77. In an adding and writing machine, the combination with adding mechanism denomination selecting means, typewriting numeral keys and coupling devices, of a tabulating mechanism, and means controlled by said tabulating mechanism effectively to operate said coupling devices to control the connections of the typewriting numeral keys with the adding mechanism denomination numeral selecting means, substantially as described.

78. In an adding and writing machine, the combination with adding mechanism denomination selecting means, and typewriting mechanism numeral keys, of a carriage, tabulating mechanism controlling said carriage, and coupling devices controlled by said tabulating mechanism whereby said typewriting numeral keys may be entrained with said denomination selecting means, substantially as described.

79. In a computing machine, the combination with numeral keys and a traveling carriage, of computing wheels, means for turning said computing wheels to an extent determined by said keys as controlled by said carriage, carry-over devices, and means for producing a movement of said carriage and concomitantly supplying the power for making said carry-over devices effective.

80. In a computing machine, the combination with numeral keys and a traveling carriage, of computing wheels, means for turning said computing wheels to an extent determined by said keys as controlled by said carriage, carry-over devices, power means for driving said carry-over devices, and means for producing a movement of the carriage and concomitantly supplying the power for making said power means effective.

81. In a computing machine, the combination with numeral keys and a traveling carriage, of computing wheels, a master wheel for turning said computing wheels, power means for turning said master wheel to an extent determined by the numeral keys operated, carry-over devices for said computing wheels, and power means independent of the master wheel for driving said carry-over devices.

82. In a combined typewriting and computing machine, the combination with numeral keys and computing wheels, of a master wheel, a traveling carriage, means to coöperate therewith for determining on what computing wheel said master wheel shall be effective, a source of power independent of said keys for turning said master wheel, carry-over means for said computing wheel, and power means also independent of said keys for driving said carry-over devices at times determined by the computing wheels.

83. In a computing machine, the combination with a computing wheel, of a carry-over pawl therefor, teeth on said computing wheel, a device coöperating with said teeth to positively arrest said wheels against overthrow by the pawl, said arresting device connected to said carry-over pawl to move therewith, power means for driving said computing wheel, and separate power means for driving the carry-over pawl.

84. In a computing machine, the combination with a computing wheel, of a carry-over pawl therefor, teeth on said computing wheel, a device coöperating with said teeth to positively arrest said wheel against overthrow by the pawl, said arresting device connected to said carry-over pawl to move therewith, numeral keys for determining how far said computing wheel shall be driven, power means independent of said keys for driving said computing wheel, and a spring forming a source of power for driving said carry-over pawl.

85. In a combined typewriting and computing machine, the combination with a typewriter carriage and a rack bar on said carriage, of a stop settable on said rack bar for positioning said carriage, a totalizer, a separately settable denomination selector for said totalizer, and means for positioning said denomination selector automatically at the same denomination with respect to the totalizer as the carriage for the typewriter is positioned with reference to said stop.

86. In a combined typewriting and computing machine, the combination with a traveling carriage and numeral keys, of a denomination selector controlled by said carriage, computing wheels, escapement devices controlled by said keys for determining how said wheels shall be turned, connecting devices between the keys and the escapement devices, said connecting devices comprising a part moving bodily at the operation of the keys, and means for moving said bodily-moving connecting part clear of said keys when said denomination selector passes beyond the units wheel.

87. In a combined typewriting and computing machine, the combination with a typewriter carriage and a denominational tabulating device comprising a settable stop for positioning said carriage, of a totalizer, a denomination selector for said totalizer, and connections whereby the totalizer is put under the control of said denomination selector at the same relative position as the typewriter carriage is positioned with reference to said stop.

88. In a combined typewriting and computing machine, the combination with numeral keys and computing wheels, of a master wheel, a traveling carriage for determining the relation of said computing wheels and master wheel, a power device for turning said master wheel, a stop shaft for determining how far said master wheel shall turn, a connecting device between said shaft and said keys, and means for moving said connecting device to ineffective position when a digit has been registered on the units wheel.

89. In a writing and adding machine, the combination of a group of numeral keys; printing means actuated by said keys; a carriage and a platen, of adding mechanism controlled by said numeral keys and having a universal bar operatable by any of said keys, said universal bar being movable through substantially the same distance by the different keys; and means for connecting said universal bar to and disconnecting it from said adding mechanism.

90. In an adding machine, the combination of a group of numeral keys; a universal bar operatable by any of said keys, adding mechanism including a carriage; a step-by-step feed device for said carriage controlled by said universal bar; and means for disconnecting said universal bar from said step-by-step feed device.

91. In a combined typewriting and adding machine, the combination of a carriage for the typewriting machine, a carriage for the adding machine, and a tabulator for bringing the typewriter carriage to any desired point in the adding column without affecting the adding machine carriage.

92. The combination of a movable paper-carriage, an adding mechanism mounted in fixed position relative to the transverse movement of the paper-carriage, operating keys therefor normally wholly out of coöperative relation therewith, and a tabulating mechanism controlling the movement of the paper-carriage and operable to bring the keys and adding mechanism into coöperative relation with each other.

93. The combination of a movable paper-carriage, the operating keys and printing devices, a plurality of adding wheels mounted in fixed position relative to the transverse movement of the paper-carriage, an actuating device for the adding wheels normally out of coöperative relation with the operating keys, and means for bringing the actuating device and operating keys into coöperative relation with each other.

94. The combination with a movable carriage, the operating keys and printing devices, a plurality of adding wheels mounted in fixed position relative to the transverse movement of the carriage, an actuating device for said adding wheels normally out of coöperative relation with the operating keys, and means operable at a movement of the carriage for bringing said actuating device and operating keys into coöperative relation with each other.

95. The combination of a movable paper-carriage, the regular type keys and printing devices of the typewriter, a plurality of adding wheels mounted in fixed position relative to the transverse movement of the paper-carriage, an actuating device for the adding wheels adapted to be operated by certain of said type keys but normally out of coöperative relation with said keys, and a tabulating mechanism controlling the movement of the paper-carriage and the coöperation of the type keys and actuating device.

96. In a combined typewriting and computing machine, the combination of a typewriter carriage, a denomination selector, a tabulating device, and means, including a part of said tabulating device, for setting said selector so that it will move step by step with said carriage.

97. In a combined typewriting and computing machine, the combination of a typewriter carriage, a computer carriage, and means extending to said carriages to control them in a manner to cause the computer carriage to move step-by-step with the typewriter carriage during the computation of several numbers in succession, during a single traverse of the typewriter carriage, said computer carriage being returnable independently of the typewriter carriage after the printing and computing of every number, whereby cross computation can be performed by means of said computer carriage.

98. In a combined typewriting and computing machine, the combination with a typewriter carriage, of a computer carriage, the latter mounted for a movement limited substantially to the width of the computing zone, said typewriter carriage movable into and out of several computing zones during each run, and means coöperative with said carriages to position them simultaneously preparatory to writing and computing each of a succession of numbers in a single run of the typewriter carriage.

99. The combination with a series of computing wheels and a power-driven master wheel therefor, of an indexing wheel, a stop or dog normally restraining said indexing wheel, a series of numeral keys, means under the control of the keys to withdraw said dog, a rotary variable stop device, means controlled by said keys for connecting said variable stop device to said indexing wheel when said dog is withdrawn, means controlled by the keys for variably arresting said variable stop device, to limit the rotation of the indexing wheel, and means dependent upon the return of the keys for restoring said dog and disconnecting said variable stop device from said indexing wheel.

100. The combination with a series of computing wheels and a power-driven master wheel therefor, of an indexing wheel, a stop or dog normally restraining said indexing wheel, a series of numeral keys, means under the control of the keys to withdraw said dog, a rotary variable stop device, means controlled by said keys for connecting said variable stop device to said indexing wheel when said dog is withdrawn, means controlled by the keys for variably arresting said variable stop device, to limit the rotation of the indexing wheel, means dependent upon the return of the keys for restoring said dog and disconnecting said variable stop device from said indexing wheel, and a spring for rotating said variable stop device back to normal position.

101. The combination with a series of computing wheels and a power-driven master wheel therefor, of an indexing wheel, a stop or dog normally restraining said indexing wheel, a series of numeral keys, means under the control of the keys to withdraw said stop, an indexing shaft extending along said series of keys, means controlled by said keys for connecting said shaft to said indexing wheel when said stop is withdrawn, means controlled by the keys for variably arresting said indexing shaft and connected indexing wheel, and means dependent upon the return of the keys for restoring said dog and disconnecting said indexing shaft from said indexing wheel.

102. In a combined typewriting and computing machine having a typewriter carriage and tabulating mechanism for the typewriter carriage, including a column stop adjustable in the direction of the run of the carriage, and also having a computer carriage, the combination with mechanism for tabulating the computer carriage to different denominational positions, of means connected to said computer tabulating mechanism for setting said adjustable column stop to different denominational positions.

103. In a combined typewriting and computing machine, the combination of a typewriter carriage, a computer carriage, mechanism for back-tabulating the computer carriage to different denominational positions, tabulating mechanism for the typewriter carriage, including an adjustable column stop, and means connected to said back-tabulating mechanism for setting said column stop back to different denominational positions.

104. In a combined typewriting and computing machine, the combination of a typewriter carriage, a computer carriage, mechanism for back-tabulating the computer carriage to different denominational positions, tabulating mechanism for the typewriter carriage, including an adjustable column stop, and means connected to said back-tabulating mechanism for setting said column stop back to different denominational position; said column stop effective to position said typewriter carriage in the same place whether the typewriter carriage is being advanced or returned.

105. The combination of a typewriter carriage, a computer carriage, numeral keys to control both carriages, and a tabulating mechanism including manually operable devices and means for enabling them to tabulate either of said carriages independently of the other.

106. The combination of a typewriter carriage, a computer carriage, numeral keys to control both carriages, and a tabulating mechanism including manually operable devices and means for enabling them to tabulate both of said carriages simultaneously or either of said carriages independently of the other.

107. The combination of a typewriter carriage, a computer carriage, numeral keys to control both carriages, and a tabulating mechanism including manually operable devices and means for enabling them to tabulate both carriages simultaneously or one of them independently of the other.

108. The combination of a typewriter carriage, a column stop therefor adjustable in the direction of the run of the carriage, denominational tabulating devices to coöperate with said carriage with various adjustments of said column stop, a computing carriage movable independently of said typewriter carriage, and means connected to said tabulating devices to enable the denominational position of said computing carriage to be determined simultaneously with that of said typewriter carriage.

109. The combination of a typewriter carriage, a column stop therefor adjustable in the direction of the run of the carriage, devices to coöperate with said carriage to determine the denominational position thereof upon its return stroke regardless of the adjustment of said column stop, a computing carriage movable independently of said typewriter carriage, and means to enable the denominational position of said computing carriage upon its return stroke to be determined simultaneously with that of said typewriter carriage.

110. The combination of numeral keys, computing mechanism inclusive of a denomination-selecting carriage controlled by said keys, and also inclusive of an indexing device connected to said keys, and means dependent upon the movement of said carriage for controlling the operativeness of the connection between said keys and said indexing device.

111. The combination of numeral keys, computing mechanism inclusive of a denomination-selecting carriage controlled by said keys, and also inclusive of an indexing device connected to said keys, means dependent upon the movement of the carriage for disconnecting said keys from said indexing device, and means for restoring such connection preparatory to effecting the next computation.

112. The combination of numeral keys, computing mechanism inclusive of a denomination-selecting carriage controlled by said keys, and also inclusive of an indexing device connected to said keys, means dependent upon the movement of the carriage for disconnecting said keys from said indexing device, and means associated with said carriage to operate at a movement thereof, for reëstablishing said connection preparatory to the next computation.

113. A combined typewriting and computing machine, including type-operating numeral keys and a denomination-selecting carriage controlled by said keys, a master wheel and a set of computing wheels whose relative denominational positions are determined by said carriage, an indexing device controlled by said keys for said master wheel, and means dependent upon the movement of said carriage for controlling the operativeness of said indexing device by said keys.

114. In a combined typewriting and computing machine, the combination of numeral keys, a denomination-selecting carriage controlled by said keys, computing mechanism inclusive of a rotatable indexing device, connections to enable said keys to control the rotation of said indexing device, and means dependent upon the movement of said carriage when moving beyond the units place in a computation, for effecting a disconnection between the keys and said indexing device.

115. In a combined typewriting and computing machine, the combination of numeral keys, a denomination-selecting carriage controlled by said keys, computing mechanism inclusive of a rotatable indexing device, connections to enable said keys to control the rotation of said indexing device, means dependent upon the movement of said carriage when moving beyond the units place in a computation, for effecting a disconnection between the keys and said indexing device, and means associated with the carriage and effective upon the movement of the carriage preparatory to effecting the next computation, for restoring the connections between the keys and the indexing device.

116. In a combined typewriting and computing machine, the combination with a typewriter carriage and a tabulating device therefor, of a computing carriage movable relatively to the typewriter carriage, and means connecting the computing carriage with the tabulating device of the typewriter carriage, to move the computing carriage at the tabulating operation of the typewriter carriage, thereby to bring the computing carriage to position to perform a new computation.

117. In a combined typewriting and computing machine, the combination with a typewriter carriage and tabulating mechanism therefor, including a denomination-selecting device, of a computing carriage movable relatively to the typewriter carriage, and means connecting the computing carriage with said denomination-selecting device, to be moved to the denominational position corresponding to that at which the carriage is arrested.

118. In a combined typewriting and computing machine, the combination of a typewriter carriage, a computing carriage, said carriages relatively movable, a single tabulating mechanism, and means to enable said tabulating mechanism to control either of said carriages at will.

119. In a combined typewriting and computing machine, the combination of a typewriter carriage, a computing carriage, said carriages relatively movable, a single tabulating mechanism, and means to enable said tabulating mechanism to control either of said carriages at will or both of them concomitantly.

120. In a combined typewriting and computing machine, the combination of a typewriter carriage, a computing carriage, said carriages relatively movable, a single tabulating mechanism, said tabulating mechanism including a manually operable device by which the position of said typewriter carriage may be controlled, and means for connecting said computing carriage with said manually operable device at will.

121. In a combined typewriting and computing machine, the combination of a typewriter carriage, a computing carriage, said carriages relatively movable, a single tabulating mechanism, said tabulating mechanism including a manually operable device by which the position of said computing carriage may be controlled, and means to control said typewriter carriage by said manually operable device at will.

122. In a combined typewriting and computing machine, the combination of a typewriter carriage, a computing carriage, said carriages relatively movable, a single tabulating mechanism, including a manually operable device, and means to enable said manually operable device to determine the positions of both carriages.

123. The combination with a computing carriage, a spring to propel the same, numeral keys, and carriage-feeding mechanism under the control of said keys, of a manually operable device for returning said computing carriage to begin a new computation; said manually operable device forming a back-tabulating mechanism whereby the computing carriage is brought to the desired denominational position for beginning the next computation.

124. In a combined typewriting and computing machine, the combination with a typewriter carriage and a tabulating device for arresting said carriage in several column positions or zones, of a computing carriage movable relatively to the typewriter carriage to compute when the typewriter carriage is in sundry of said zones, and means connecting the computing carriage with the tabulating device of the typewriter carriage, to position the computing carriage mechanically for performing computations in said zones.

125. In a combined typewriting and computing machine, the combination with a computing carriage capable of operation in several zones, and numeral keys to control said carriage, of a tabulating device for said carriage, an indexing device, means connected to said tabulating device to put said indexing device under the control of said keys, and means dependent upon the movement of the carriage for releasing said indexing device from the control of said keys.

126. In a combined typewriting and computing machine, the combination with a computing carriage capable of operation in several zones, and numeral keys to control said carriage, of a tabulating device for said carriage, an indexing device, a universal member common to said keys and connected to said indexing device to control the same, means connected to said tabulating device to put said indexing device under the control of said universal device, and means dependent upon the movement of the carriage for releasing said indexing device from the control of said universal device.

127. The combination of numeral keys, computing mechanism inclusive of a denomination-selecting carriage controlled by said keys, and also inclusive of an indexing device connected to said keys, means dependent upon the movement of said carriage for controlling the operativeness of the connection between said keys and said indexing device, and manually operable means for controlling the operativeness of such connection, thereby to render said indexing device operable or inoperable by the numeral keys, at will.

128. The combination of numeral keys, computing mechanism inclusive of a denomination-selecting carriage controlled by said keys, and also inclusive of an indexing device connected to said keys, means dependent upon the movement of the carriage for disconnecting said keys from said indexing device, means for restoring such connection preparatory to effecting the next computation, a key to render such connection inoperative at will, and a separate key to restore the operativeness of such connection.

129. The combination of numeral keys, computing mechanism inclusive of a denomination-selecting carriage controlled by said keys, and also inclusive of an indexing device connected to said keys, means dependent upon the movement of the carriage for disconnecting said keys from said indexing device, and manually operable means for controlling the operativeness of such connection, thereby to render said indexing device operable or inoperable by the numeral keys, at will.

130. The combination of type-operated numeral keys, computing mechanism inclusive of an indexing device connected to said keys, a key for effecting disconnection between said numeral keys and said indexing device, and an additional key for reëstablishing such connection.

131. The combination of type-operated numeral keys, computing mechanism inclusive of a universal member operable by said keys, an indexing wheel controlled by said universal member, a key for making disconnection between said universal member and said indexing wheel, and an additional key for reëstablishing such connection.

132. The combination of type-operating numeral keys, computing wheels, computing mechanism controlled by said keys and extending to said wheels, a key having means to effect disconnection between the keys and the wheels, and a separate key for restoring such connection.

133. The combination of a master member, means for operating the same, a set of computing wheels, a carriage for producing relative movement between said master member and said wheels, spring-driven carry-over devices, means normally holding said carry-over devices out of use, means controlled by the computing wheels to release the carry-over devices for operation, and means for restoring the carry-over devices to normal positions, said restoring means having a connection with said carriage to operate concomitantly with a movement thereof.

134. The combination of a set of computing wheels, a denomination-controlling carriage, power-operated carry-over devices, means normally restraining said carry-over devices, means controlled by the computing wheels to release the carry-over devices for operation, and means to restore the carry-over devices, said restoring means having a connection with said carriage to act concomitantly with the return movement thereof.

135. The combination with a set of computing wheels and means for operating them, of pawls or detents to engage said wheels, spring-driven carry-over devices, means normally holding said carry-over devices out of use, means to coöperate with said computing wheels to release said carry-over devices for operation, and means controlled by said carry-over devices to release said detents.

136. The combination of a set of computing wheels, a denomination-controlling carriage, power-operated carry-over devices, means normally restraining said carry-over devices, means controlled by the computing wheels to release the carry-over devices for operation, means to restore the carry-over devices, said restoring means having a connection with said carriage, to be effective concomitantly with a return movement of said carriage, detents for said wheels, means for releasing said detents one by one, and means associated with said carry-over devices for releasing said detents.

137. The combination of numeral keys, a set of computing wheels, power-operated carry-over devices, means normally preventing said carry-over devices from operating, means controllable by the computing wheels for causing said carry-over devices to operate, detents for said wheels, means called into action by said keys for releasing said detents seriatim, and means associated with said carry-over devices for releasing said detents.

138. The combination of numeral keys, a set of computing wheels, detents normally coöperating with said computing wheels, means dependent upon the operation of said keys for releasing said detents one by one, means controlled by the keys for operating the wheels, carry-over devices, means to enable the carry-over devices to release the detents as required at the carry-over operations, and other detents brought into use by the carry-over devices.

139. In an adding and writing machine, the combination with adding mechanism, including digit pieces, and typewriting numeral trains including keys, said digit pieces normally ineffective to control computation, of a tabulating mechanism, and means controlled by said tabulating mechanism to render said digit pieces effective to control computation at the operation of the numeral keys.

140. In an adding and writing machine, the combination with adding mechanism, including digit pieces, a carriage, computing wheels, a master member, and means to enable said carriage to effect relative movement between said master member and said computing wheels, said digit pieces normally ineffective to control computation, of a tabulating mechanism, and means controlled by said tabulating mechanism to position said carriage and simultaneously render said digit pieces effective to control computation at the operation of the numeral keys.

141. In a combined typewriting and computing machine, the combination of a typewriter carriage, denomination selecting mechanism for the computing mechanism, means for moving said carriage step by step, independent means for moving a part of said denomination selecting mechanism step by step, tabulator mechanism for positioning said typewriter carriage, connections from said tabulator mechanism to said step by step moving part for positioning said part in harmony with the typewriter carriage, and means for preventing said part from being positioned by said tabulator mechanism so that the tabulator mechanism can be used to position the typewriter carriage without affecting the computing mechanism.

142. In a combined typewriting and computing machine, the combination of a carriage in the typewriter, a denominational tabulator for said carriage, denomination selecting mechanism in the computer and including a device that moves step by step independently of said typewriter carriage, and means controlled by the typewriter tabulator for setting said step by step moving device, said device being settable independently of the typewriter carriage to any desired denominational position.

143. In an adding machine, the combination of two wheels side by side, each bearing numerals from "zero" to "9," means for rotating the right-hand wheel, means by which carrying is effected when an accumulation greater than 9 is registered on the right-hand wheel, a detent or dog to engage said wheel, means to prevent an over rotation of said wheel during the carrying, and means to disengage said detent or dog from said wheel as said over-rotation preventing means is brought into operation.

144. The combination with a computing device including a series of denominational members and transfer mechanism therefor; of a traveling carriage, and means for retracting the transfer mechanism, said retracting means having a connection with said carriage to be capable of operating concomitantly with a movement thereof.

145. The combination with a computing device including a series of denominational members and transfer mechanism therefor; of a traveling carriage, means for operating the members and transfer mechanism, and means for restoring the transfer mechanism to its normal position, said restoring means having a connection with said carriage to be capable of operating concomitantly with a movement thereof.

146. The combination with a computing device including a series of denominational members and transfer mechanism; of means for operating the members and transfer mechanism, a traveling carriage supporting the operating mechanism, and means for restoring the transfer mechanism to its operative position, said restoring means having a connection with said carriage to be capable of operating concomitantly with a movement thereof.

147. In a combined typewriting and computing machine, the combination with numeral keys and a typewriter carriage under the control of said keys, of computing mechanism also under the control of said keys, a part dependent upon the movement of said typewriter carriage and automatically movable to act upon said computing mechanism to silence the same when the typewriter carriage reaches a predetermined position, and means for restoring said computing mechanism to effective condition.

148. The combination with a typewriting mechanism including a carriage and also including individually-operable numeral keys to control said carriage, and printing devices operated as the keys are struck; of mechanism for computing and carrying, including members which are controlled individually in the proper denominational order as said keys are struck, whereby, when a digit is printed, the corresponding denominational member in the computing mechanism is correspondingly controlled; and a common actuating device operable after the conclusion of printing of the series of digits of a number to be computed, for completing the cycle of operations of the computing and carrying mechanism.

149. The combination with typewriting mechanism, including a carriage and also including individually-operable numeral keys to control said carriage, and printing devices operating as the keys are struck; of mechanism for computing and carrying, including a computing carriage settable relatively to said typewriter carriage repeatedly during each run of said typewriter carriage, said computing and carrying mechanism also including members which are controlled individually in the proper denominational order as said keys are struck, whereby, when a digit is printed, the corresponding denominational member in the computing mechanism is correspondingly controlled; and a common actuating device operable during the re-setting of said computing carriage after the conclusion of the printing of the series of digits of a number to be computed, for completing the cycle of operations of the computing and carrying mechanism.

150. In combination, a traveling carriage movable to a plurality of different column positions or fields, a computing device, operating mechanism for the computing device, and means for causing a coöperative relation to be established between the computing device and its operating means successively as the carriage reaches different column positions during a single traverse or forward movement of the carriage.

151. In combination, a totalizer and a master wheel, a traveling carriage movable across a plurality of columns or adding fields, and means for causing a coöperative relation to be established between the totalizer and the master wheel successively as the carriage moves across successive columns or adding fields during the forward movement of the carriage.

152. The combination with a platen and printing mechanism, relatively movable to permit several columns of numbers to be printed on a work-sheet, of a single computing device, and means for computing thereon numbers printed in all of the columns, said computing device including a series of digit carriers, one for each denomination, and said computing means including mechanism for imparting movement to the digit carriers corresponding in order to the order of the numeral printed in any column, such movement corresponding in extent to the value of the numeral printed.

153. The combination with means for printing several columns of numbers, of a grand totalizer including a series of digit carriers, and keys for operating the digit carriers of said totalizer to compute the grand total of the several columns as the numbers are printed therein.

154. The combination with means for printing several columns of numbers in parallel relation, of a grand totalizer comprising a series of number wheels corresponding in number to the number of numerals capable of being printed in each of the columns, and keys for operating the number wheels of said totalizer to compute the grand total of the several columns.

155. The combination with a platen and printing mechanism, of means for effecting the relative step-by-step movement thereof to permit the printing of several columns on a work-sheet, a computing device, and means for operating said device to effect a computation including the numbers in the several columns.

156. The combination with printing mechanism and a platen for the support of the work-sheet, said platen and printing mechanism being relatively movable to permit the printing of several columns of numbers on the work-sheet, a computing device, and means for operating said computing device, as numbers are printed in different columns to compute a result with such numbers included in the computation, said means also controlling the relative movement of the platen and printing mechanism.

157. The combination with printing mechanism for printing several columns of numbers, and a carriage movable to effect the presentation of the printing mechanism to any desired column, of a grand computing device, and means for operating said grand computing device to compute the result of the combined operations of the printing mechanism, simultaneously with the printing of numbers in different columns, said means controlling the movement of the carriage.

158. The combination with a typewriter including a platen and printing mechanism, relatively movable to permit the printing of columns at different points on a work-sheet backed by the platen, and keys, of a computing device, and means for operating the same to effect a computation embracing the numbers in several columns.

159. The combination with key-operated printing mechanism arranged to print several parallel columns of numbers, of a totalizer, and key-operated actuating means arranged to actuate the totalizer as the numbers are printed in the different columns.

160. The combination with key-operated printing mechanism arranged to print several parallel columns of numbers, of a totalizer, key-operated actuating means arranged to actuate the totalizer as the numbers are printed in the different columns, and means for repositioning the actuating means with respect to the totalizer after each operation of the latter embracing a complete number.

161. The combination with a platen and printing mechanism, relatively movable to permit several columns of numbers to be printed on one sheet, of a computing device and an actuator therefor, said computing device and actuator being relatively movable to change the denominational relation thereof during the printing of a number in a column, and means for causing relative movement of the computing device and actuator to change the columnar relation of the computing device and its actuator whereby, when a number has been printed in one column and accumulated by the computing device, said computing device and its actuator will be relatively positioned to permit the computing device to accumulate another number printed in a different column.

162. The combination with a computing device including a series of denominational members and carrying means, of a master wheel, and separate means for effecting relative lateral movement of the computing device and its master wheel in opposite directions to permit repeated operations of the computing device, each operation involving successive number wheels.

163. The combination with a set of computing wheels and means for operating them, of pawls or detents positively locking said wheels against normal operation, spring-driven carry-over devices, means normally holding said carry-over devices out of use, means to coöperate with said computing wheels to release said carry-over devices for operation, and means controlled by said carry-over devices to release said detents.

In testimony whereof I affix my signature in presence of two witnesses.

BENJAMIN M. DES JARDINS.

Witnesses:
J. A. WATSON,
ARTHUR L. BRYANT.